(12) United States Patent
Ueno et al.

(10) Patent No.: US 7,215,491 B2
(45) Date of Patent: May 8, 2007

(54) OPTICAL PATH SWITCHING DEVICE AND METHOD

(75) Inventors: Ichiro Ueno, Isehara (JP); Takashi Hiraga, Ikeda (JP); Toshiko Mizokuro, Ikeda (JP); Noritaka Yamamoto, Ikeda (JP); Hiroyuki Mochizuki, Ikeda (JP); Norio Tanaka, Tokyo (JP)

(73) Assignees: National Institute of Advanced Industrial Science and Technology, Tokyo (JP); Dainichiseika Color & Chemical Mfg. Co., Ltd., Tokyo (JP)

( * ) Notice: Subject to any disclaimer, the term of this patent is extended or adjusted under 35 U.S.C. 154(b) by 206 days.

(21) Appl. No.: 10/525,031

(22) PCT Filed: Sep. 11, 2003

(86) PCT No.: PCT/JP03/11609

§ 371 (c)(1), (2), (4) Date: Feb. 17, 2005

(87) PCT Pub. No.: WO2004/027508

PCT Pub. Date: Apr. 1, 2004

(65) Prior Publication Data

US 2005/0248844 A1 Nov. 10, 2005

(30) Foreign Application Priority Data

Sep. 20, 2002 (JP) .............................. 2002-275713

(51) Int. Cl.
*G02B 9/00* (2006.01)
(52) U.S. Cl. ...................... 359/739; 359/721; 359/636; 359/244; 398/55
(58) Field of Classification Search .................... None
See application file for complete search history.

(56) References Cited

U.S. PATENT DOCUMENTS

| 3,575,668 | A | * | 4/1971 | Smith ........................... 372/33 |
| 4,262,198 | A | * | 4/1981 | Gupta et al. ................. 250/340 |
| 4,585,301 | A | | 4/1986 | Bialkowski et al. |
| 5,125,001 | A | * | 6/1992 | Yagi et al. .................... 372/92 |
| 5,568,496 | A | * | 10/1996 | Justus et al. .................. 372/11 |
| 2003/0002038 | A1 | * | 1/2003 | Mawatari ..................... 356/300 |

FOREIGN PATENT DOCUMENTS

EP 1 011 007 A1 6/2000

(Continued)

*Primary Examiner*—Arnel Lavarias
(74) *Attorney, Agent, or Firm*—Oliff & Berridge, PLC

(57) ABSTRACT

An optical path switching method includes converging and irradiating, on a light absorption layer film provided in a thermal lens forming element including at least the film, each of a control light having a wavelength selected from a wavelength band which is absorbed by the film and a signal light having a wavelength selected from a wavelength band which is not absorbed by the film. A thermal lens is reversibly formed according to a distribution of refraction index created by a temperature increase generated in and around an area of the film in which the control light is absorbed according to whether or not the control light is irradiated. The converged signal light is output either in its converged form or after its spread angle is changed. A includes a hole and reflector where the signal light output is either passed through the hole or reflected by reflector.

30 Claims, 15 Drawing Sheets

FOREIGN PATENT DOCUMENTS

| | | |
|---|---|---|
| JP | A-60-014221 | 1/1985 |
| JP | A-63-243298 | 10/1988 |
| JP | A-04-099609 | 3/1992 |
| JP | A-08-286220 | 11/1996 |
| JP | A-08-320535 | 12/1996 |
| JP | A-08-320536 | 12/1996 |
| JP | B2-2599569 | 1/1997 |
| JP | A-09-329816 | 12/1997 |
| JP | A-10-090733 | 4/1998 |
| JP | A-10-090734 | 4/1998 |
| JP | A-10-148852 | 6/1998 |
| JP | A-10-148853 | 6/1998 |
| JP | A-11-194373 | 7/1999 |

\* cited by examiner

OPTICAL PATH SWITCHING DEVICE AND METHOD

TECHNICAL FIELD

The present invention relates to an optical path switching device and method used in the field of optical communication and optical information processing.

BACKGROUND ART

In order to deal with the exponential increase in network traffic due to the prevalent use of the Internet and intranets in offices and homes, there exists a need for an optical path switching device (optical switch) which does not employ an electric signal, namely, an optical-to-optical direct switch. Known approaches of the device and method for switching optical paths such as optical fibers, optical waveguides, and light propagation paths may include a space division type in which optical paths are switched within an optical waveguide or between optical waveguides, a wavelength division multiplex type in which switching is performed by splitting a multiplexed light having a plurality of wavelengths into respective optical paths according to the wavelengths, a time division multiplex type in which optical paths of a time-division multiplexed light are switched periodically, and a free space type in which light propagation paths in an open space are spatially divided and compounded using mirrors, shutters, or the like. Each of these approaches may be multiplexed, and a combination of these approaches may be used.

A space division type optical switch is still under development, but a number of approaches have been proposed, including a type using a directional coupler, a type in which a copy of the optical signal is produced using an optical divider and a light is switched on and off by a gate element, and a type in which the refraction index of a waveguide is changed at a crossing or a crossing portion of a Y-branch so as to transmit or reflect the light propagated in the waveguide. A Mach-Zehnder interferometer type optical waveguide switch in which the refraction index of the waveguide is changed by a thermooptic effect caused by heating with an electric heater has recently been publicized as being at a state of development close to actual use. However, a switch of this type is disadvantageous not only in its slow response speed of approximately 1 millisecond, but also in that an electric signal must be used to operate the optical switch.

As free space type optical switches, development efforts are being made towards approaches such as a MEMS (micro electro mechanical system), an EARS (exciton absorption reflection switch), a multistage beam shifter type optical switch, a hologram type optical switch, and a liquid crystal switch. These switches have disadvantages in that they include mechanically moving parts and have polarization dependency. It is therefore considered that a free space type optical switch is not yet ready for actual use.

Much research is directed to development of all-optical optical elements and optical control methods which make use of changes in transmittance and refraction index generated by irradiating light on an optical element, to thereby directly use light to modulate light intensity and frequency.

For the purpose of developing a novel information processing technique employing all-optical optical elements and the like, the present inventors have been conducting research on optical control methods using an organic nanoparticle photothermal lens-forming element obtained by dispersing organic dye aggregates in a polymer matrix (disclosed in Takashi HIRAGA, Norio TANAKA, Kikuko HAYAMI, and Tetsuro MORIYA, "Production, Structure Evaluation, and Photophysical Properties of Dye Clusters and Aggregates", Electrotechnical Laboratory Report, published by Electrotechnical Laboratory (Japan), Agency of Industrial Science and Technology, Ministry of International Trade and Industry, Vol. 59, No. 2, pages 29–49 (1994)). At the present, an element which uses a control light (633 nm) to modulate a signal light (780 nm) has been developed. In this element, the control light and the signal light are arranged to be incident coaxially and parfocally. The operation principle is such that absorption of the control light allows temporary formation of a thermal lens which refracts the signal light. This element achieves a high response speed of approximately 20 nanoseconds.

Japanese Patent Laid-Open Publications Nos. Hei 8-286220, Hei 8-320535, Hei 8-320536, Hei 9-329816, Hei 10-90733, Hei 10-90734, and Hei 10-148852 describe an optical control method in which a control light is irradiated on an optical element having an optically responsive composition, so as to reversibly change the transmittance and/or refraction index of a signal light within a wavelength band differing from that of the control light, thereby modulating intensity and/or luminous flux density of the signal light transmitted through the optical element. According to this method, the control light and the signal light are each converged and irradiated on the optical element, while the optical paths of the control light and the signal light are adjusted such that the control light and the signal light overlap in their regions (beam waists) in the vicinity of the respective foci having the highest photon density.

Japanese Patent Laid-Open Publication No. Hei 10-148853 discloses an optical control method in which an optical element having an optically responsive composition is irradiated with a control light and a signal light having different wavelengths. The wavelength of the control light is selected from a wavelength band which is absorbed by the optically responsive composition. The optically responsive composition allows a thermal lens to be reversibly formed according to a distribution of density change caused by a temperature increase generated in and around an area of the optically responsive composition in which the control light is absorbed. The intensity and/or the luminous flux density of the signal light transmitted through the thermal lens can thereby be modulated. Japanese Patent Laid-Open Publication No. Hei 10-148853 further describes that the above-referenced optical element may be a dye/resin film or a dye solution film, and that a response time of the signal light in response to irradiation of the control light at a power of 2 to 25 mW is less than 2 microseconds.

The above-referenced thermal lens effect is explained as follows. At a center portion of light absorption, molecules which absorbed the light convert the light into heat. The heat is transferred toward the surrounding areas, thereby creating a temperature distribution. As a result, the refraction index of the light-transmitting medium changes from the center of light absorption toward the outward areas in a spherical manner, generating a distribution of refraction index which is small in the center of light absorption and increasing toward the outward areas. This produces a light refraction effect which functions as a concave lens. Such a thermal lens effect has already been employed for a considerable time in the field of spectral analysis, and, at the present, an ultra-high sensitivity spectral analysis for detecting light absorption by just one molecule is also possible (as described in Kitao FUJIHARA, Kei-ichiro FUWA, and Takayoshi KOBAYASHI, "Laser-Induced Thermal Lens Effect and Its Application to Colorimetry", Chemistry, published by Kagakudojin, Vol. 36, No. 6, pages 432–438 (1981); and Takehiko KITAMORI and Shiro SAWADA, "Photothermal Conversion Spectral Analysis", Analysis, published by The Japan Society for Analytical Chemistry, March 1994, pages 178–187).

As a method for deflecting an optical path using the thermal lens effect or a change in refraction index created by heat, Japanese Patent Laid-Open Publication No. Sho 60-14221 discloses deflecting light by supplying heat to a medium by a heat-generating resistor to produce a refraction index distribution. However, because this method involves generating heat with a heat-generating resistor and heating the medium via heat conduction, the problem of "heat diffusion" is integral to this method. In other words, heat diffusion hinders creation of a fine pattern of thermal gradient in a large area, making it difficult to obtain a desired refraction index distribution. Further, even when a photolithographic technique used for a semiconductor integrated circuit is employed to process the heat-generating resistor into a fine pattern, the actual results achieved have been limited, inevitably increasing the element size. When the element size is increased, the optical system also becomes larger and more complex. Moreover, because a heat-generating resistor is used to heat the medium via heat conduction, this method is integrally defective in that the response speed is slow and the frequency of change in refraction index cannot be increased.

Japanese Patent Laid-Open Publication No. Hei 11-194373 describes a deflection element comprising at least an optical element composed of an optically responsive composition, and intensity distribution adjusting means for irradiating light on the optical element in a light intensity distribution having a wedge-like shape. A refraction index distribution is created in the optical element using a control light, and the created refraction index distribution is used to deflect a signal light having a wavelength differing from that of the control light. Although this approach is advantageous in that light can be controlled by light, there exists a restriction that the deflection angle must be less than 30 degrees such that the switching direction of an optical path cannot be freely set.

DISCLOSURE OF THE INVENTION

An advantage of the present invention is that it provides an optical path switching device and method in which no electric circuits or mechanically moving parts are used. Such optical path switching device and method are reliable, have excellent durability, and have no polarization dependency. Further, the optical path switching angles and directions can be freely set. Other advantages of the present invention are that attenuation of the signal light intensity is reduced, and that the device and method can be used in a multi-linked manner.

To accomplish the above advantages, an optical path switching device according to the present invention comprises a light absorption layer film arranged such that at least a control light focuses on the light absorption layer film, means for converging and irradiating on the light absorption layer film each of a control light having a wavelength selected from a wavelength band which is absorbed by the light absorption layer film and a signal light having a wavelength selected from a wavelength band which is not absorbed by the light absorption layer film, and a thermal lens forming element including the light absorption layer film. A thermal lens is reversibly formed according to a distribution of refraction index created by a temperature increase generated in and around an area of the light absorption layer film in which the control light is absorbed. When the control light is not irradiated and the thermal lens is not formed, the converged signal light is output while spreading at a normal spread angle, and, when the control light is irradiated and the thermal lens is formed in the vicinity of an incident surface of the light absorption layer film, the converged signal light is output while spreading at a spread angle greater than the normal spread angle. In this manner, the thermal lens forming element allows the spread angle of the output signal light to be changed according to whether or not the control light is irradiated. The optical path switching device further comprises a mirror for changing an optical path. The mirror includes a hole through which passes, when the control light is not irradiated and the thermal lens is not formed, the signal light output from the thermal lens forming element at the normal spread angle as is or after the spread angle is changed by a receiver lens. The mirror further includes means for reflecting, when the control light is irradiated and the thermal lens is formed in the vicinity of an incident surface of the light absorption layer film, the signal light output from the thermal lens forming element at the normal spread angle as is or after the spread angle is changed by the receiver lens.

The receiver lens is used to change the signal light output from the thermal lens forming element at the normal spread angle or at the spread angle greater than the normal spread angle into a substantially "parallel" beam. However, it should be noted that the resulting beam need not be completely parallel.

To accomplish the above advantages, another optical path switching device according to the present invention comprises a light absorption layer film arranged such that at least a control light focuses on the light absorption layer film, means for converging and irradiating on the light absorption layer film each of a control light having a wavelength selected from a wavelength band which is absorbed by the light absorption layer film and a signal light having a wavelength selected from a wavelength band which is not absorbed by the light absorption layer film, and a thermal lens forming element including the light absorption layer film. A thermal lens is reversibly formed according to a distribution of refraction index created by a temperature increase generated in and around an area of the light absorption layer film in which the control light is absorbed. When the control light is irradiated and the thermal lens is formed in the vicinity of an output surface of the light absorption layer film, the converged signal light is output as converged, and, when the control light is not irradiated and the thermal lens is not formed, the converged signal light is output at a normal spread angle. In this manner, the thermal lens forming element allows the spread angle of the output signal light to be changed according to whether or not the control light is irradiated. The optical path switching device further comprises a mirror for changing an optical path. The mirror includes a hole through which passes, when the control light is irradiated and the thermal lens is formed in the vicinity of an output surface of the light absorption layer film, the converged signal light output from the thermal lens forming element. The mirror further includes means for reflecting, when the control light is not irradiated and the thermal lens is not formed, the signal light output from the thermal lens forming element at the normal spread angle as is or after being passed through a receiver lens provided for changing the spread angle.

To accomplish the above advantages, an optical path switching method according to the present invention comprises converging and irradiating, on a light absorption layer film provided in a thermal lens forming element including at least the light absorption layer film, each of a control light having a wavelength selected from a wavelength band which is absorbed by the light absorption layer film and a signal light having a wavelength selected from a wavelength band which is not absorbed by the light absorption layer film. Arrangement of the light absorption layer film is adjusted such that at least the control light focuses within the light absorption layer film. A thermal lens is reversibly formed according to a distribution of refraction index created by a temperature increase generated in and around an area of the light absorption layer film in which the control light is absorbed. When the control light is not irradiated and the thermal lens is not formed, the converged signal light is output from the thermal lens forming element while spreading at a normal spread angle, and, when the control light is irradiated and the thermal lens is formed in the vicinity of an incident surface of the light absorption layer film, the converged signal light is output from the thermal lens forming element while spreading at a spread angle greater than the normal spread angle. In this manner, the spread angle of the output signal light is changed according to whether or not the control light is irradiated. Subsequently, when the control light is not irradiated and the thermal lens is not formed, the signal light output from the thermal lens forming element at the normal spread angle is, as is or after the spread angle is changed by a receiver lens, passes through a hole in a mirror with a hole and allowed to proceed straight. On the other hand, when the control light is irradiated and the thermal lens is formed in the vicinity of an incident surface of the light absorption layer film, the signal light output from the thermal lens forming element while spreading at the spread angle greater than the normal spread angle is, as is or after the spread angle is changed by the receiver lens, reflected using a reflection surface of the mirror with the hole so as to change an optical path.

To accomplish the above advantages, another optical path switching method according to the present invention comprises converging and irradiating, on a light absorption layer film provided in a thermal lens forming element including at least the light absorption layer film, each of a control light having a wavelength selected from a wavelength band which is absorbed by the light absorption layer film and a signal light having a wavelength selected from a wavelength band which is not absorbed by the light absorption layer film. Arrangement of the light absorption layer film is adjusted such that at least the control light focuses within the light absorption layer film. A thermal lens is reversibly formed according to a distribution of refraction index created by a temperature increase generated in and around an area of the light absorption layer film in which the control light is absorbed. When the control light is irradiated and the thermal lens is formed in the vicinity of an output surface of the light absorption layer film, the converged signal light is output from the thermal lens forming element as converged, and, when the control light is not irradiated and the thermal lens is not formed, the converged signal light is output from the thermal lens forming element at a normal spread angle. In this manner, the spread angle of the output signal light is changed according to whether or not the control light is irradiated. Subsequently, when the control light is irradiated and the thermal lens is formed in the vicinity of the output surface of the light absorption layer film, the converged signal light output from the thermal lens forming element passes through a hole in a mirror with a hole and allowed to proceed straight. On the other hand, when the control light is not irradiated and the thermal lens is not formed, the signal light output from the thermal lens forming element at the normal spread angle is, as is or after the spread angle is changed by a receiver lens, reflected using a reflection surface of the mirror with the hole so as to change an optical path.

BRIEF DESCRIPTION OF THE DRAWINGS

FIG. 12 is a schematic diagram illustrating a region in the vicinity of a focus of a Gaussian beam converged using a condenser lens or the like.

BEST MODE FOR CARRYING OUT THE INVENTION

[Thermal Lens Forming Element]

According to the present invention, a multilayer structure composed of laminated films may be favorably used as a thermal lens forming element. Example structures of the multilayer film include the following:

(1) a single light absorption layer film (This may literally be a single layer of "light absorption film", or may alternatively be a multilayer thin film having a double layer structure including "light absorption film/thermal lens forming layer" or a triple layer structure including "light absorption film/thermal lens forming layer/light absorption film". It is to be noted that the "light absorption layer films" in the examples (2) to (10) listed below may employ similar structures.), (2) light absorption layer film/heat insulation layer film, (3) heat insulation layer film/light absorption layer film/heat insulation layer film, (4) light absorption layer film/heat conduction layer film, (5) heat conduction layer film/light absorption layer film/heat conduction layer film, (6) light absorption layer film/heat insulation layer film/heat conduction layer film, (7) heat conduction layer film/light absorption layer film/heat insulation layer film, (8) heat conduction layer film/light absorption layer film/heat insulation layer film/heat conduction layer film, (9) heat conduction layer film/heat insulation layer film/light absorption layer film/heat insulation layer film,

(10) heat conduction layer film/heat insulation layer film/light absorption layer film/heat insulation layer film/heat conduction layer film,

(11) graded index lens/(light transmission layer/) any of the above thermal lens forming elements (1)–(10), or

(12) graded index lens/(light transmission layer/) any of the above thermal lens forming elements (1)–(10)/graded index lens.

The above "(light transmission layer/)" refers to providing a light transmission layer as necessary. An anti-reflection film (AR coating film) may further be provided on a light incident surface and a light output surface according to necessity.

Figure 5:
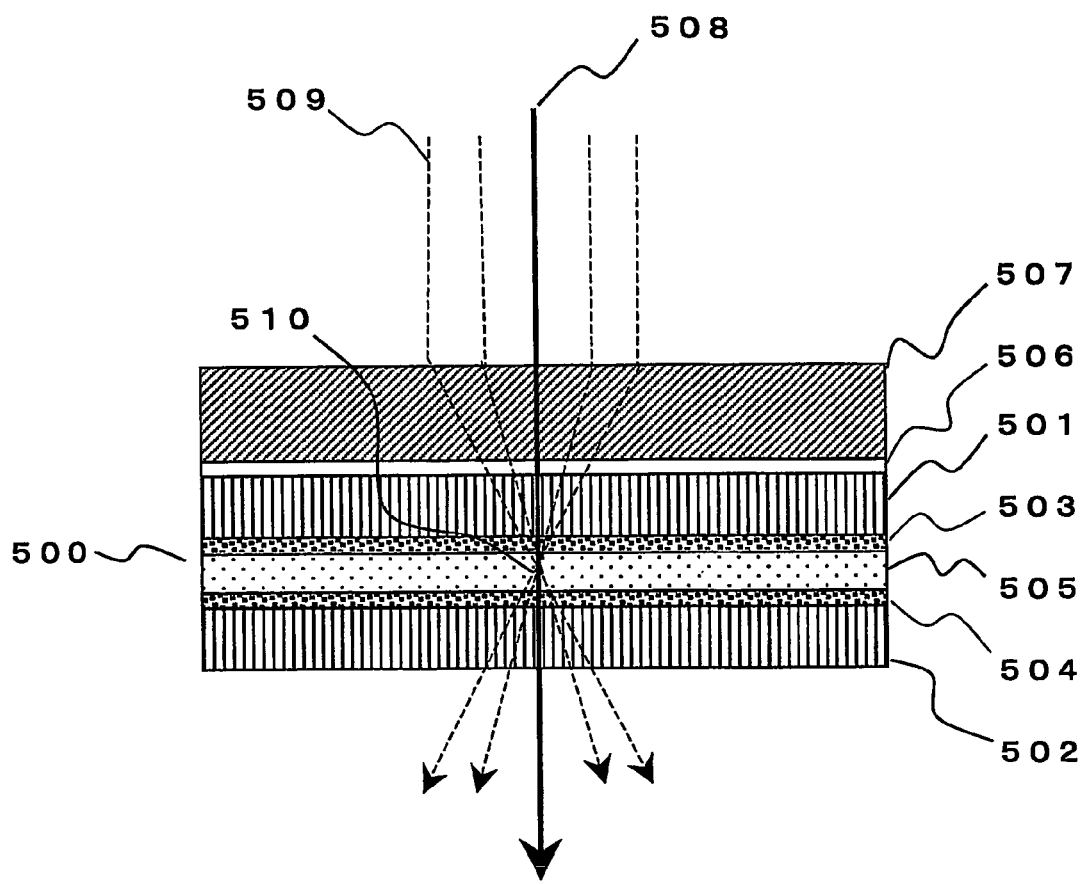
FIG. 5 is a cross-sectional view showing an example structure of a thermal lens forming element.

FIG. 5 is a cross-sectional view showing one example structure of a thermal lens forming element. As shown in FIG. 5, a thermal lens forming element 500 may be formed by laminating, in the order from the side from which a control light 509 and a signal light 508 are incident, a graded index lens 507/a light transmission layer 506 a heat conduction layer film 501/a light absorption layer film 503/a thermal lens forming layer 505/a light absorption film 504/ and a heat conduction layer film 502. The light beams of the control light 509 in FIG. 5 are illustrated schematically without showing refractions generated between the layer films.

Materials, production methods, and thickness for each of the light absorption layer film, thermal lens forming layer film, heat insulation layer film, heat conduction layer film, light transmission layer, and graded index lens are explained below in sequence.

It should be noted that materials for the light absorption layer film, thermal lens forming layer film, heat insulation layer film, heat conduction layer film, light transmission layer, and graded index lens may include, as additives, known antioxidants, ultraviolet absorbers, singlet oxygen quenchers, dispersing agents, and the like, to the extent that the functions of the materials are not hindered.

[Materials for Light Absorption Layer Film]

Various known materials may be used as a light-absorbing material for the light absorption layer film within the thermal lens forming element according to the present invention.

Specific examples of preferable materials for the light absorption layer film within the thermal lens forming element according to the present invention include a monocrystal of a compound semiconductor such as GaAs, GaAsP, GaAlAs, InP, InSb, InAs, PbTe, InGaAsP, or ZnSe; a material obtained by dispersing fine particles of the above-referenced compound semiconductor into a matrix material; a monocrystal of a metal halide (such as potassium bromide or sodium chloride) doped with dissimilar metal ions; a material obtained by dispersing fine particles of the above-referenced metal halide (such as copper bromide, copper chloride, or cobalt chloride) into a matrix material; a monocrystal of a cadmium chalcogenide such as CdS, CdSe, CdSeS, or CdSeTe doped with dissimilar metal ions such as copper; a material obtained by dispersing fine particles of the above-referenced cadmium chalcogenide into a matrix material; a monocrystal thin film, polycrystal thin film, or porous thin film of a semiconductor such as silicon, germanium, selenium, or tellurium; a material obtained by dispersing fine particles of a semiconductor such as silicon, germanium, selenium, or tellurium into a matrix material; a monocrystal corresponding to a gemstone doped with metal ions (namely, a laser crystal), such as ruby, alexandrite, garnet, Nd:YAG, sapphire, Ti:sapphire, or Nd:YLF; a ferroelectric crystal such as lithium niobate ($LiNbO_3$), $LiB_3O_5$, $LiTaO_3$, $KTiOPO_4$, $KH_2PO_4$, $KNbO_3$, or $BaB_2O_2$ doped with metal ions (such as iron ions); and quartz glass, soda glass, borosilicate glass, or other glass doped with metal ions (such as neodymium ions and erbium ions); a material obtained by dissolving or dispersing a dye in a matrix material; and an amorphous dye aggregate.

Among the above, it is especially preferable to use a material obtained by dissolving or dispersing a dye in a matrix material because use of such a material makes it possible to select the matrix material and the dye from a wide selection, and the material can be easily processed as a thermal lens forming element.

Specific examples of dyes that can be preferably used in an optical path switching device and method according to the present invention include a xanthene dye such as rhodamine B, rhodamine 6G, eosine, and phloxine B; an acridine dye such as acridine orange and acridine red; an azo dye such as ethyl red and methyl red; a porphyrin dye; a phthalocyanine dye; a cyanine dye such as 3,3'-diethylthiacarbocyanine iodide and 3,3'-diethyloxadicarbocyanine iodide; a triarylmethane dye such as ethyl violet and Victoria blue R; a naphthoquinone dye; an anthraquinone dye; a naphthalene tetracarboxydiimide dye; and a perylene tetracarboxydiimide dye.

In an optical path switching device and method according to the present invention, the above-referenced dyes can be used alone or in combinations of two or more types.

The matrix material used in an optical path switching device and method according to the present invention can be any desired material that satisfies the two conditions of:

(1) having high transmittance in the wavelength range of a light used in the optical path switching device and method according to the present invention; and (2) allowing stable and favorable dissolution or dispersion of a dye or other various fine particles used in the optical path switching device and method according to the present invention.

Examples of inorganic matrix materials that can be used include metal halide monocrystal, metal oxide monocrystal, metal chalcogenide monocrystal, quartz glass, soda glass, borosilicate glass, and a low-melting glass produced by a sol-gel process.

As an organic matrix material, various organic polymer materials may be employed. Specific examples of such organic polymer materials include resins such as polystyrene, poly (α-methylstyrene), polyindene, poly(4-methyl-1-pentene), polyvinylpyridine, polyvinylformal, polyvinylacetal, polyvinylbutyral, poly(vinyl acetate), poly(vinyl alcohol), poly(vinyl chloride), poly(vinylidene chloride), poly (vinyl methyl ether), poly (vinyl ethyl ether), poly (vinyl benzyl ether), poly(vinyl methyl ketone), poly(N-vinylcarbazole), poly(N-vinylpyrrolidone), poly(methyl acrylate), poly(ethyl acrylate), polyacrylic acid, polyacrylonitrile, poly(methyl methacrylate), poly(ethyl methacrylate), poly(butyl methacrylate), poly(benzyl methacrylate), poly(cyclohexyl methacrylate), polymethacrylic acid, polymethacrylamide, polymethacrylonitrile, polyacetaldehyde, polychloral, poly(ethylene oxide), poly(propylene oxide), poly(ethylene terephthalate), poly(butylene terephthalate), polycarbonates (a bisphenol+carbonic acid), poly(diethyleneglycol bis-allylcarbonates), 6-nylon, 6,6-nylon, 12-nylon, 6,12-nylon, poly(ethyl aspartate), poly(ethyl glutamate), polylysine, polyproline, poly(γ-benzyl-L-glutamate), methyl cellulose, ethyl cellulose, benzyl cellulose, hydroxyethyl cellulose, hydroxypropyl cellulose, acetyl cellulose, cellulose triacetate, cellulose tributylate, alkyd resin (phthalic anhydride+glycerin), fatty acid modified alkyd resin (fatty acid+phthalic anhydride+glycerin), unsaturated polyester resin (maleic anhydride+phthalic anhydride+propylene glycol), epoxy resin (a bisphenol+ epichlorohydrin), polyurethane resin, phenol resin, urea resin, melamine resin, xylene resin, toluene resin, and guanamine resin; organic polysilane such as poly(phenyl methyl silane); organic polygermane; and copolymers and copolycondensates of the above-listed materials. Further, it is possible to use a macromolecular compound obtained by performing plasma polymerization of a compound that normally does not polymerize, such as carbon disulfide, carbon tetrafluoride, ethyl benzene, perfluorobenzene, perfluorocyclohexane, or trimethylchlorosilane. Moreover, as the matrix material, it is also possible to use a material obtained by linking to the above-referenced macromolecular compound residues of the dye as a monomer side chain, a crosslinking group, a copolymerizing monomer, or as a polymerization initiating terminal group. A chemical bond may be formed between the dye residue and the matrix material.

Known methods can be used to dissolve or disperse the dye in the matrix material. Preferable methods include a method in which a dye and a matrix material are dissolved and mixed in a common solvent, and the solvent is subsequently removed by evaporation; a method in which a dye is dissolved or dispersed in the raw material solution of an inorganic matrix material to be prepared by a sol-gel process, and then the matrix material is formed into its final form; a method in which a dye is dissolved or dispersed into the monomers of an organic macromolecular matrix material, using a solvent when necessary, and the monomers are subsequently polymerized or polycondensed to form the matrix material; and a method in which a solution obtained by dissolving a dye and an organic macromolecular matrix material in a common solvent is dropped into a solvent in which both the dye and the thermoplastic organic macromolecular matrix material are insoluble, and the obtained precipitate is filtered and dried, then heated and fused. It is known that, by employing an appropriate combination of dye and matrix material and a suitable processing method, the dye molecules can be flocculated to produce particular aggregates referred to as "H-aggregate", "J-aggregate", or the like. Dye molecules in a matrix material can be used under a condition in which the dye molecules are formed into such a flocculated or aggregated state.

Furthermore, known methods can be used to disperse the above-referenced fine particles in the matrix material. Preferable methods that can be used include a method in which the fine particles are dispersed in a solution of matrix material or a solution of precursor material of the matrix material, and the solvent is subsequently removed by evaporation; a method in which the fine particles are dispersed into the monomers of an organic macromolecular matrix material, using a solvent when necessary, and the monomers are subsequently polymerized or polycondensed to form the matrix material; a method in which a metal salt such as cadmium perchlorate or gold chloride is used as a precursor material of the fine particles, the metal salt is dissolved or dispersed in an organic macromolecular matrix material, and subsequently either processing using hydrogen sulfide gas to deposit fine particles of cadmium sulfide in the matrix material, or heating to deposit fine particles of gold in the matrix material are performed; a chemical vapor deposition method; and a sputtering method.

When the dye is capable of existing alone in the form of an amorphous thin film which only causes a low level of light scattering, the amorphous thin film can be employed as the light absorption layer film without using a matrix material.

Further, when the dye is able to exist alone in the form of a microcrystalline aggregate which does not cause light scattering, the microcrystalline aggregate of the dye can be employed as the light absorption layer film without using a matrix material. When the dye microcrystalline aggregate used as the light absorption layer film is provided by laminating thereon a thermal lens forming layer (such as resin), a heat conduction layer film (such as glass), and/or a heat insulation layer film (such as resin), as described above in the description regarding the thermal lens forming element of the present invention, no substantial light scattering is caused if the particle diameter of the dye microcrystal is less than ⅕ of the shorter one of the signal light wavelength or the control light wavelength.

[Combination of Material for the Light Absorption Layer Film, Wavelength Band of the Signal Light, and Wavelength Band of the Control Light]

In an optical path switching device and method according to the present invention, an appropriate combination of a material for the light absorption layer film, a wavelength band of the signal light, and a wavelength band of the control light can be selected and employed according to intended use.

In one example of material selection, a wavelength or wavelength band of the signal light is first determined according to intended use. Subsequently, a material for the light absorption layer film and a wavelength of the control light may be selected in a combination optimal for controlling the determined wavelength or wavelength band of the signal light. Alternatively, wavelengths of the signal light and the control light may first be determined according to intended use, and then a light absorption layer film material appropriate for this combination may be selected.

[Material Composition of the Light Absorption Film, Thickness of the Light Absorption Film of the Light Absorption Layer, and Thickness of the Thermal Lens Forming Layer]

In the thermal lens forming layer used for an optical path switching device and method according to the present invention, the light absorption layer film may be a single layer film of light absorption layer film alone, a double layer structure including a "light absorption film/thermal lens forming layer" structure, or a triple layer structure including a "light absorption film/thermal lens forming layer/light absorption film" configuration. Preferably, the total thickness of the light absorption layer film does not exceed double the confocal distance of the converged control light. Further, in order to achieve a higher response speed, it is preferable that the thickness of the light absorption layer film including all the laminated thin films does not exceed the confocal distance of the converged control light.

Under these conditions, the material composition and the thickness of the light absorption film (provided as one or two films) of the light absorption layer can be determined, in combination, using as a reference the transmittance of the control light and the signal light transmitting through the light absorption layer film. For example, among the material composition of the light absorption film, at least the concentration of the component for absorbing the control or signal light may be first determined, and subsequently the thickness of the light absorption film (provided as one or two films) of the light absorption layer can be selected such that a particular value is achieved as the transmittance of the control and signal lights transmitting through the thermal lens forming element. Alternatively, according to a necessity concerning device design, the thickness of the light absorption film (provided as one or two films) of the light absorption layer can be first determined at a particular value, and subsequently the composition of the materials of the light absorption film can be adjusted such that a particular value is achieved as the transmittance of the control and signal lights transmitting through the thermal lens forming element.

For accomplishing a sufficiently large and speedy thermal lens effect using the lowest possible optical power in the thermal lens forming layer of an optical path switching device and method according to the present invention, the optimal values of transmittance of the control and signal lights transmitting through the light absorption layer film can be defined as follows.

In the thermal lens forming layer of an optical path switching device and method according to the present invention, it is preferable that control of the concentration and state of the light-absorbing component in the light absorption layer film and selection of the thickness of the light absorption film (provided as one or two films) of the light absorption layer be performed such that the transmittance of the control light propagating through the light absorption layer film within the thermal lens forming element is in the range between 90–0%.

Meanwhile, it is preferable that control of the concentration and state of the light-absorbing component in the light absorption layer film and selection of the thickness of the light absorption film (provided as one or two films) of the light absorption layer be performed such that, during the period when the control light is not irradiated, the transmittance of the signal light propagating through the light absorption layer film within the thermal lens forming element is in the range defined by a minimum value of 10% or higher and a maximum value as close to 100% as possible.

A minimum value for the thickness of the thermal lens forming layer film within the light absorption layer film is selected according to the material of the thermal lens forming layer, as explained below.

[Material and Thickness of the Thermal Lens Forming Layer Film within the Light Absorption Layer Film]

While it is possible to allow a single layer of light absorption film to function as the thermal lens forming layer, it is preferable to separately select and laminate optimal materials for the respective functions of light absorption and thermal lens formation.

As a material for the thermal lens forming layer film within the light absorption layer film, a liquid, liquid crystal, or solid material can be used. In particular, the thermal lens forming layer is preferably composed of an organic compound selected from a group consisting of an amorphous organic compound, organic compound liquid, and liquid crystal. When the material of the thermal lens forming layer is liquid crystal or liquid, the thermal lens forming layer may be created by forming the light absorption film and/or the conduction layer film using a material that can maintain its own shape, providing a cavity corresponding to the thickness of the thermal lens forming layer, and injecting therein the fluid-state material for the thermal lens forming layer. On the other hand, when the material of the thermal lens forming layer is solid, the light absorption film can be laminated on one or both sides of the thermal lens forming layer.

More than one material may be used to form the thermal lens forming layer. For example, the thermal lens forming layer may be a film composed by laminating a plurality of types of solid materials, or by laminating solid and liquid materials.

While the thickness of the thermal lens forming layer depends on the type of material used, the thickness may range from several nanometers to several hundred μm, and more preferably from several ten nanometers to several ten μm.

As noted above, it is preferable that the total thickness of the light absorption layer film formed by laminating the thermal lens forming layer film and one or two light absorption films does not exceed double the confocal distance of the converged control light.

While any of a liquid, liquid crystal, or solid material can be used as a material for the thermal lens forming layer film within the light absorption layer film, regardless of state, the material preferably has a refraction index highly dependent on temperature.

Physical property values of temperature dependency of refraction index for major organic compound liquids and water can be found in D. Solimini: J. Appl. Phys., Vol. 37, 3314 (1966). Temperature change (in units of 1/K) in refraction index with respect to light having a wavelength of 633 nm is greater for alcohols such as methanol ($3.9 \times 10^{-4}$) compared to water ($0.8 \times 10^{-4}$), and further greater for non-hydrogen-bonded organic solvents such as cyclopentane ($5.7 \times 10^{-4}$), benzene ($6.4 \times 10^{-4}$), chloroform ($5.8 \times 10^{-4}$), and carbon disulfide ($7.7 \times 10^{-4}$).

When employing a liquid crystal as the material for the thermal lens forming layer film within the light absorption layer film, a desired known liquid crystal can be used. Specific examples of acceptable liquid crystals include various cholesterol derivatives; 4'-n-alkoxybenzylidene-4-cyanoanilines such as 4'-n-butoxybenzylidene-4-cyanoaniline and 4'-n-hexylbenzylidene-4-cyanoaniline; 4'-alkoxybenzylideneanilines such as 4'-ethoxybenzylidene-4-n-butylaniline, 4'-methoxybenzylideneaminoazobenzene, 4-(4'-methoxybenzylidene)aminobiphenyl, and 4-(4'-methoxybenzylidene)aminostilbene; 4'-cyanobenzylidene-4-alkoxyanilines such as 4'-cyanobenzylidene-4-n-butoxyaniline and 4'-cyanobenzylidene-4-n-hexyloxyaniline; carbonic esters such as 4'-n-butoxycarbonyloxybenzylidene-4-methoxyaniline, p-carboxyphenyl n-amyl carbonate, and n-heptyl 4-(4'-ethoxyphenoxycarbonyl)phenyl carbonate; 4'-alkoxyphenyl 4-alkylbenzoates such as 4'-ethoxyphenyl 4-n-butylbenzoate, 4'-octyloxyphenyl 4-n-butylbenzoate, and 4'-hexyloxyphenyl 4-n-pentylbenzoate; azoxybenzene derivatives such as 4,4'-di-n-amyloxyazoxybenzene and 4,4'-di-n-nonyloxyazoxybenzene; and 4-cyano-4'-alkylbiphenyls such as 4-cyano-4'-n-octylbiphenyl and 4-cyano-4'-n-dodecylbiphenyl. Further, it is also possible to use a ferroelectric liquid crystal such as 4',4"-octyloxybiphenyl (2S,3S)-3-methyl-2-chloropentanoate, 4-hexyloxyphenyl 4'-(2-methylbutyl)biphenyl-4-carboxylate, and 4-(2-methylbutyl)phenyl 4'-octylbiphenyl-4-carboxylate.

When employing a solid material as the material for the thermal lens forming layer film within the light absorption layer film, it is particularly preferable to use an amorphous organic compound which causes a low level of light scattering and has a refraction index highly dependent on temperature. Specifically, a known optical resin can be selected for use from among various organic polymer materials, in the same manner as for the above-described matrix material. According to the document edited by Gijutsu Joho Kyokai Co., Ltd., "Most Recent Developments in Optical Resins and Their Characteristics, High-Precision Component Designs, and Shaping Techniques", Gijutsu Joho Kyokai (1993), p. 35, temperature changes (in units of 1/K) in refraction index for optical resins are described, for example, as being $1.2 \times 10^{-4}$ for poly(methyl methacrylate), $1.4 \times 10^{-4}$ for polycarbonate, and $1.5 \times 10^{-4}$ for polystyrene. These resins can be favorably used as a material for the thermal lens forming layer film within the light absorption layer film.

While the above-referenced organic solvents are advantageous in that their refraction indices have greater temperature dependency compared to those of the optical resins, the organic solvents can also be inconvenient in that they may reach the boiling point during a temperature increase by irradiation of the control light (this problem does not occur when a high-boiling solvent is used). In contrast, an optical resin such as a polycarbonate from which all volatile impurities have been removed can be used under an extreme condition in which the temperature is increased by irradiation of the control light to a level exceeding 250° C.

[Heat Insulation Layer Film]

When the heat insulation layer film is a gas, inert gases such as nitrogen, helium, neon, and argon, can be used, as well as air.

When employing a liquid as the heat insulation layer film, any desired liquid may be selected as long as the liquid has a thermal conductivity equivalent to or smaller than that of the light absorption layer film, transmits the control and signal lights, and does not dissolve or corrode the material of the light absorption layer film. For example, when the light absorption layer film is composed of poly(methyl methacrylate) containing cyanine dye, fluid paraffin may be used as the heat insulation layer film.

When employing a solid as the heat insulation layer film, any desired solid may be selected as long as the solid has a thermal conductivity equivalent to or smaller than that of the light absorption layer film (light absorption film and thermal lens forming layer), transmits the control and signal lights, and does not react with the materials of the light absorption layer film and the heat conduction layer film. For example, when the light absorption layer film is composed of poly(methyl methacrylate) containing cyanine dye, poly(methyl methacrylate) containing no dye (having the heat conductivity of $0.15$ $Wm^{-1}K^{-1}$ at 300K) can be used as the heat insulation layer film film.

[Material for Heat Conduction Layer Film]

For the heat conduction layer film, any desired material may be used as long as the material has a heat conductivity higher than the light absorption layer film, and does not react with the materials of the light absorption layer film and the heat insulation layer film. Examples of materials having a high heat conductivity and a low optical absorption in the wavelength band of visible light include diamond (having the heat conductivity of 900 $Wm^{-1}K^{-1}$ at 300K), sapphire (46 $Wm^{-1}K^{-1}$ at 300K), quartz monocrystal (in a direction parallel to the c-axis, 10.4 $Wm^{-1}K^{-1}$ at 300K), quartz glass (1.38 $Wm^{-1}K^{-1}$ at 300K), and hard glass (1.10 $Wm^{-1}K^{-1}$ at 300K). These materials can be favorably used as the heat conduction layer film.

[Material for Light Transmission Layer]

In the thermal lens forming element according to the present invention, a graded index lens for converging the control light may be laminated via a light transmission layer on the incident side of the thermal lens forming element from which the control light is introduced. A solid material similar to that of the heat insulation layer film and/or the heat conduction layer film can be used for the light transmission layer. The light transmission layer not only literally serves as a layer for efficiently transmitting the control and signal lights, but also serves as an adhesive for attaching the graded index lens as a component of the thermal lens forming element. It is particularly preferable to use as the light transmission layer an ultraviolet curing resin or electron radiation curing resin which has a high optical transmittance in the wavelength band of the control and signal lights.

[Method for Producing the Thermal Lens Forming Element]

As a method for producing the thermal lens forming element used for the present invention, a known method can be selected for use in accordance with the structure and the types of materials used.

For example, when the light-absorbing material used for the light absorption film in the thermal lens forming element is a monocrystal as described above, the light absorption film can be produced by cutting and polishing the monocrystal.

In order to produce, for example, a thermal lens forming element having a "heat conduction layer film/light absorption film/thermal lens forming layer/light absorption film/heat conduction layer film" structure using, in combination, light absorption films composed of a matrix material containing a dye, a thermal lens forming layer made of an optical resin, and heat conduction layer films made of an optical glass, methods listed below can be employed to first form a light absorption film on a heat conduction layer film.

On a glass plate serving as the heat conduction layer film, a solution in which the dye and the matrix material are dissolved may be applied by any of spreading, blade coating, roll coating, spin coating, dipping, and spraying processes, or printed by any of planographic, letterpress, intaglio, stencil, screen, and transfer printing processes, to form a light absorption film. The light absorption film may then be prepared by employing an inorganic matrix material producing method using a sol-gel process.

To form a light absorption film on a heat conduction layer film, it is also possible to use an electrochemical film-forming method such as electrode position, electrolytic polymerization, and micelle-disruption method by electrolysis (Japanese Patent Laid-Open Publication No. Sho 63-243298) processes.

It is further possible to use the Langmuir-Blodgett technique in which a monomolecular film formed on a water surface is transferred.

To employ polymerization or polycondensation reaction of a raw material monomer, methods such as casting, reaction injection molding, plasma polymerization, and optical polymerization processes can be used when the monomer is liquid.

It is also possible to use methods such as sublimation transfer, vapor deposition, ion beam, sputtering, plasma polymerization, CVD, and organic molecular-beam deposition processes.

A method for producing a composite optical thin film (as disclosed in Japanese Patent Publication No. 2599569) may also be employed. In this method, two or more organic optical material components in forms of solution or fluid dispersion are sprayed in a high-vacuum container from respective spray nozzles provided for each of the components, such that the components are deposited on a substrate. The substrate is then subjected to a heat processing.

The above methods for producing a solid light absorption film can also be favorably used for forming a heat insulation layer film made of a solid organic polymer material.

Subsequently, when using a thermoplastic optical resin to create the thermal lens forming layer, a vacuum hot pressing technique (as disclosed in Japanese Patent Laid-Open Publication No. Hei 4-99609) can be employed to produce the thermal lens forming element having a "heat conduction layer film/light absorption film/thermal lens forming layer/light absorption film/heat conduction layer film" structure. That is, a multilayer thin film element having this structure can be produced by placing a powder or sheet of thermoplastic optical resin between two heat conduction layer films (glass plates) each having a light absorption film formed on its surface by one of the above-described methods, and heating and pressing the two plates in a high vacuum with the resin placed therebetween.

[Material and Producing Method for Graded Index Lens]

In the thermal lens forming element according to the present invention, a graded index lens for converging the control light may be laminated via a light transmission layer on the incident side of the thermal lens forming element from which the control light is introduced. A desired known material and producing method can be used to provide the graded index lens.

For example, a graded index lens can be produced using an organic polymer material by employing the phenomenon of monomer osmosis or diffusion (as disclosed in M. Oikawa, K. Iga, T. Sanada: Jpn. J. Appl. Phys, 20(1), L51–54 (1981)). In other words, using a monomer exchange technique, a graded index lens can be formed on a planar substrate in a monolithic manner. For example, methyl methacrylate (n=1.494), which is a plastic having a low refraction index, is diffused from the periphery of a 3.6 mm Φ disc-shaped mask onto a planar plastic substrate made of poly(diacryl isophthalate) (n=1.570) having a high refraction index.

Further, a graded index lens can be produced using an inorganic glass material by employing the phenomenon of inorganic ion diffusion (as disclosed in M. Oikawa, K. Iga,: Appl. Opt., 21(6), 1052–1056 (1982)). More specifically, after a mask is attached to a glass substrate, a circular window having a diameter of approximately 100 μm is formed in the mask using a photolithographic process. The glass substrate is then soaked in a molten salt to perform ion exchange, so as to create a refraction index distribution. This process is performed while applying an electric field over several hours to enhance the ion exchange. By employing this method, a lens having a diameter of 0.9 mm, focal distance of 2 mm, and numerical aperture of NA=0.23 can be formed.

[Calculation of Beam Waist Diameter]

In order to effectively exploit the thermal lens effect in an optical path switching device and method according to the present invention, the beam cross-sectional shape and size of each of the signal and control lights are preferably selected such that the beam cross-section of the signal light in the vicinity of the focus (converging point) having the highest photon density, namely, at the "beam waist", does not exceed the beam cross-section of the control light at its beam waist.

In the following will be described a case using a Gaussian beam, in which the amplitude distribution of electric field or the light flux energy distribution in a beam cross-section takes the form of a Gaussian distribution. While a condenser lens (graded index lens) is employed as the beam converging means in the description below, the beam converging means may alternatively comprise a concave mirror or a dispersed index lens.

Figure 1:
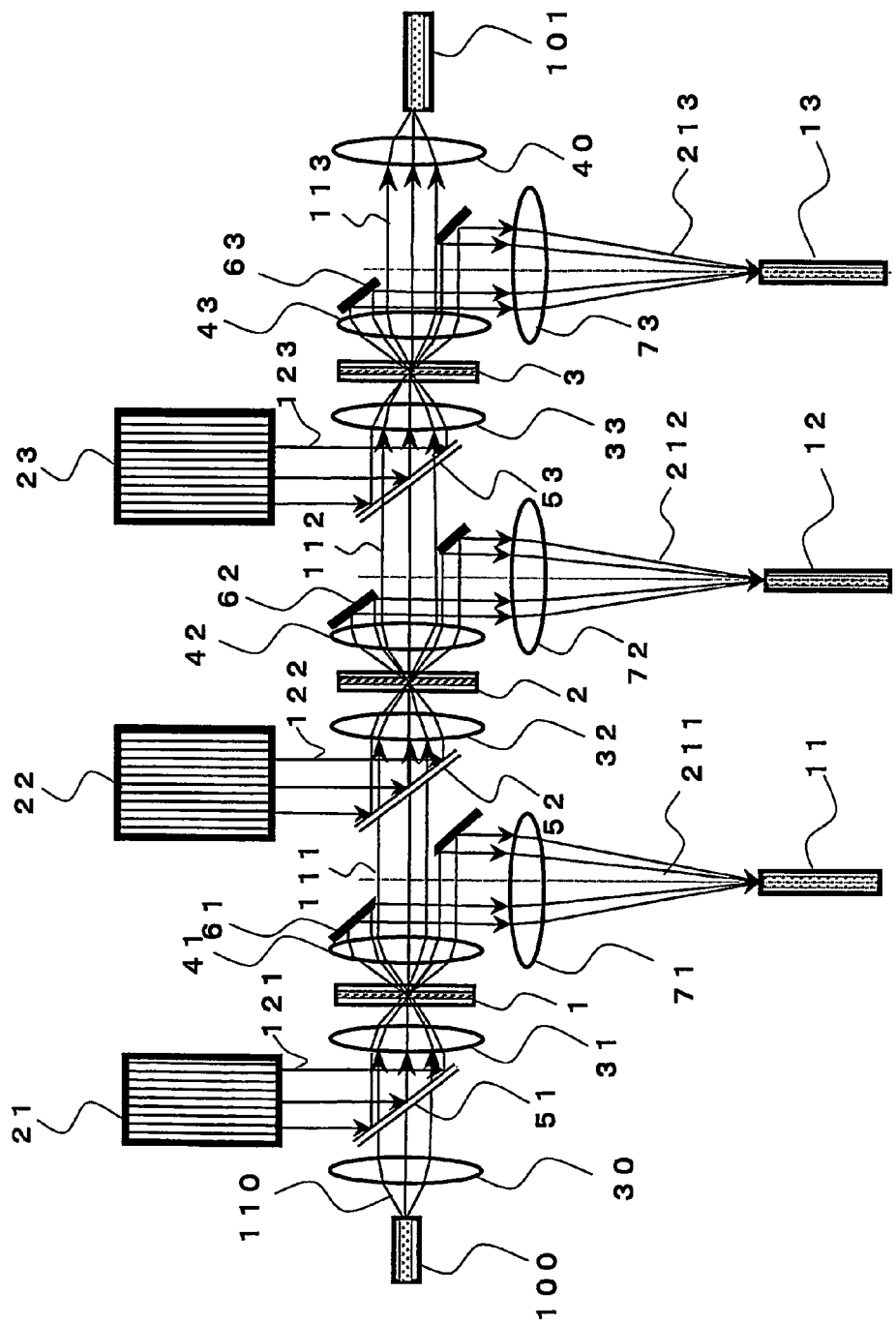
FIG. 1 is a diagram illustrating the general configuration of an optical path switching device according to an Example 1 of the present invention.
Figure 12:
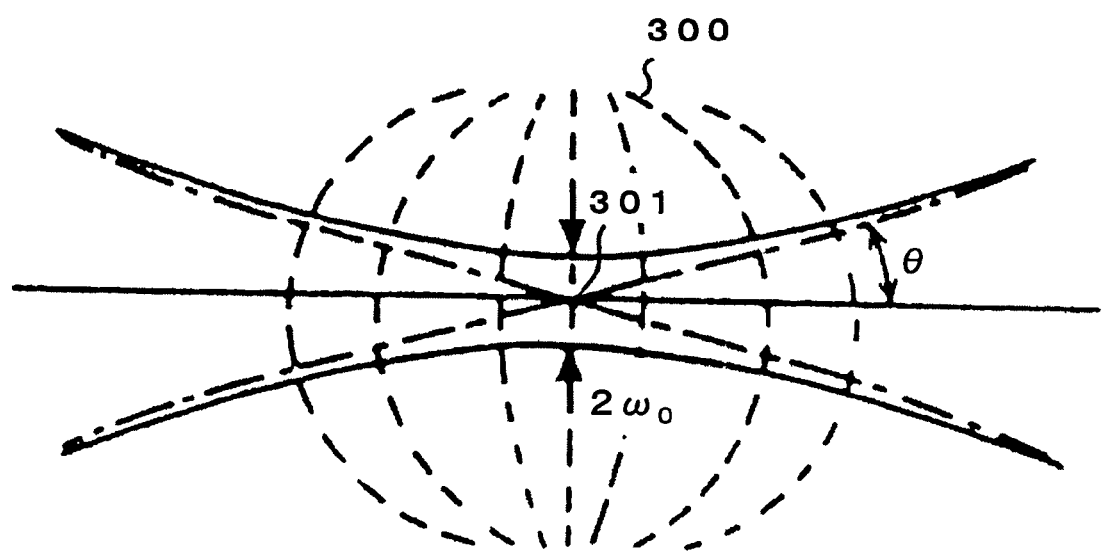

FIG. 12 illustrates the beam flux and wave front 300 in the vicinity of the focus 301 when a Gaussian beam is converged at a spread angle of 2θ using a condenser lens 31 shown in FIG. 1 or the like. The region at which the diameter 2ω of the Gaussian beam having a wavelength λ becomes a minimum value is referred to as the "beam waist". The beam waist diameter is hereinafter indicated by $2\omega_0$. Because of the effects of light diffraction, $2\omega_0$ does not become zero, and represents a finite value. Beam radius indicated by ω and $\omega_0$ can be defined as a distance measured from a beam center to a position at which the energy becomes $1/e^2$ (e is the base of natural logarithm) of the energy at the beam center portion of the Gaussian beam. Beam diameter is indicated by 2ω and $2\omega_0$. Photon density is highest at the center of the beam waist.

For a Gaussian beam, beam spread angle θ at a position sufficiently distant from the beam waist can be correlated to wavelength λ and beam waist radius $\omega_0$ by the following equation [1].

$$\pi \cdot \theta \cdot \omega_0 \approx \lambda \tag{1}$$

Here, π denotes the circular constant.

Only when the condition of "sufficiently distant from the beam waist" is satisfied, this equation can be used to calculate the beam waist radius $\omega_0$ converged using a condenser lens, based on the radius ω of the incident beam entering the condenser lens and the numerical aperture and focal distance of the condenser lens.

Furthermore, in general, beam waist diameter $2\omega_0$ obtained when a parallel Gaussian beam (having wavelength λ) is converged using a condenser lens having an effective aperture radius a and numerical aperture NA can be expressed by the following equation [2].

$$2\omega_0 \approx k \cdot \lambda / NA \tag{2}$$

Here, because coefficient k cannot be solved algebraically, this equation can be determined by performing a numerical analysis calculation concerning the light intensity distribution at the image formation surface of the lens.

By performing the numerical analysis calculation while varying the ratio between the effective aperture radius a of the condenser lens and the radius ω of the incident beam into the condenser lens, the value of coefficient k in equation [2] is determined as below.

a/ω=1; k≈0.92 a/ω=2; k≈1.3 a/ω=3; k≈1.9 a/ω=4; k≈3

In other words, the beam waist radius $\omega_0$ becomes larger as the beam radius ω becomes smaller in ratio to the effective aperture radius a of the condenser lens.

In an example wherein the condenser lens has a numerical aperture of 0.25 and an effective aperture radius of approximately 5 mm, and that this condenser lens is used to converge a signal light having a wavelength of 780 nm, when the radius ω of the incident beam into the condenser lens is 5 mm, a/ω is approximately 1 and the beam waist radius $\omega_0$ is calculated to be 1.4 μm. Meanwhile, when ω is 1.25 mm, a/ω is approximately 4, and therefore $\omega_0$ is calculated to be 4.7 μm. A control light having a wavelength of 633 nm may also be converged in a similar manner. In this case, when the radius ω is 5 mm, a/ω is approximately 1, and the beam waist radius $\omega_0$ is calculated to be 1.2 μm. When ω is 1.25 mm, a/ω is approximately 4, and therefore $\omega_0$ is calculated to be 3.8 μm.

As can be seen from this example, the cross-sectional area of a light beam at its beam waist, namely, at a region in the vicinity of the focus of the condenser lens having the highest photon density, can be minimized by enlarging the beam diameter (beam expansion) such that the intensity distribution of the incident light beam into the condenser lens approximates to a plane wave. In addition, it can also be seen that if the diameter of the incident beam into the condenser lens is unchanged, the beam waist radius is smaller when the light wavelength is shorter.

As noted above, in order to effectively exploit the thermal lens effect in an optical path switching device and method according to the present invention, the beam cross-sectional shape and size of each of the signal and control lights are preferably selected such that the beam cross-section of the signal light in the vicinity of its beam waist having the highest photon density does not exceed the beam cross-section of the control light at its beam waist. When Gaussian beams are used for both the signal and control lights, based on the above description and equations, the beam diameters of the signal and control lights in the state of parallel beams before being converged by converging means such as the condenser lens can be adjusted by performing beam expansion or the like as appropriate depending on wavelengths. In this manner, control can be performed such that the beam cross-section of the signal light in the vicinity of its beam waist having the highest photon density does not exceed the beam cross-section of the control light at its beam waist. A known optical system such as a Kepler type optical system comprising two convex lenses may be employed as means for beam expansion.

[Calculation of Confocal Distance Zc]

In general, concerning a segment of a Gaussian beam in the vicinity of its beam waist generated by converging the light flux using converging means such as a convex lens, or in other words, a segment within the confocal distance Zc on both sides of the focus, it can be considered that the converged beam in this segment is substantially a parallel beam. Confocal distance Zc can be expressed by equation [3] using the circular constant n, beam waist radius $\omega_0$, and wavelength λ.

$$Zc = \pi \omega_0^2 / \lambda \quad [3]$$

When equation [2] is substituted in equation [3], equation [4] can be obtained.

$$Zc \approx \pi (k/NA)^2 \lambda / 4 \quad [4]$$

In an example in which the condenser lens has a numerical aperture of 0.25 and an effective aperture radius of approximately 5 mm, and in which the condenser lens is used to converge a signal light having a wavelength of 780 nm, when the radius ω of the incident beam into the condenser lens is 5 mm, a/ω is approximately 1, and the beam waist radius $\omega_0$ is 1.4 μm. The confocal distance Zc is therefore calculated to be 8.3 μm. When ω is 1.25 mm, a/ω is approximately 4, and $\omega_0$ is 4.71 μm, and therefore the confocal distance Zc is calculated to be 88 μm. A control light having a wavelength of 633 nm may also be converged in a similar manner. In such a case, when the radius ω is 5 mm, a/ω is approximately 1, and the beam waist radius $\omega_0$ is 1.21 μm. The confocal distance Zc is therefore calculated to be 6.7 μm. When ω is 1.25 mm, a/ω is approximately 4, and $\omega_0$ is 3.8 μm, and therefore the confocal distance Zc is calculated to be 71 μm.

[Numerical Aperture of the Condenser Lens and the Receiver Lens]

In an optical path switching device and method according to the present invention, the signal light and the control light are irradiated so as to be coaxially converged by a condenser lens and focused within the thermal lens forming element. In a case in which a light output from the thermal lens forming element at a spread angle greater than the normal spread angle is received on a receiver lens so as to collimate the light into parallel light, it is recommended that the numerical aperture (hereinafter referred to as NA) of the receiver lens be greater than the NA of the condenser lens. More preferably, the NA of the receiver lens is no less than double the NA of the condenser lens. However, it should be noted that, when the effective aperture radius a of the condenser lens is larger than the beam radius ω of the incident light into the condenser lens (i.e., when a/ω>1), the substantial NA of the condenser lens is smaller than the actual NA of the condenser lens. It should therefore be stated that a preferable value of receiver lens NA is greater than the substantial NA (instead of the actual NA) of the condenser lens, and more preferably, no less than double the NA of the condenser lens. When the receiver lens NA is no less than double the condenser lens NA, the receiver lens can receive light without any loss even when the beam diameter of the signal light is expanded to double the initial beam diameter of the signal light first introduced into the thermal lens forming element.

[Optimal Thickness of the Light Absorption Layer Film]

Samples of thermal lens forming elements having identical optical density but differing light absorption layer film thickness were prepared by varying the thermal lens forming layer thickness while maintaining uniform thickness for one or two light absorption films that constitute the light absorption layer film. As a result of experiments using the obtained samples, it was found that optical response speed of the thermal lens effect becomes sufficiently high when the upper limit of the light absorption layer film thickness is set at double the confocal distance Zc calculated as above.

Concerning the lower limit of the light absorption layer film thickness, it is most preferable when the thickness is as small as possible within the extent that sufficient thermal lens effect can be achieved.

[Thickness of the Heat Insulation Layer Film]

An optimal range of values (lower and upper limit values) for achieving maximum magnitude and/or speed of optical response regarding the thickness of the heat insulation layer film can be experimentally determined in association with factors such as the structure of the thermal lens forming element, material and thickness of the light absorption layer film, material of the heat insulation layer film, and material and thickness of the heat conduction layer film. For example, a thermal lens forming element may be formed using normal borosilicate glass for the heat conduction layer film, polycarbonate as the material for the heat insulation layer film and the thermal lens forming layer, and a vapor deposition film of platinum phthalocyanine as the light absorption film. The structure of such a thermal lens forming element may be as follows: glass (heat conduction layer film having a thickness of 150 µm)/polycarbonate resin layer (heat insulation layer)/platinum phthalocyanine vapor deposition film (light absorption film; 0.2 µm)/polycarbonate resin layer (thermal lens forming layer; 20 µm)/platinum phthalocyanine vapor deposition film (light absorption film; 0.2 µm)/polycarbonate resin layer (heat insulation layer)/glass (heat conduction layer film; 150 µm). In this structure, thickness of the heat insulation layer film is preferably in the range between 5 nm and 5 µm, and more preferably in the range between 50 nm and 500 nm.

[Thickness of the Heat Conduction Layer Film]

An optimal range of values (in this case, lower limit value only) for achieving maximum magnitude and/or speed of optical response regarding the thickness of the heat conduction layer film can be experimentally determined in association with factors such as the structure of the thermal lens forming element, material and thickness of the light absorption layer film, material and thickness of the heat insulation layer film, and material of the heat conduction layer film. For example, a thermal lens forming element may be formed using normal borosilicate glass for the heat conduction layer film, polycarbonate as the material for the heat insulation layer film and the thermal lens forming layer, and a vapor deposition film of platinum phthalocyanine as the light absorption film. The structure of such a thermal lens forming element may be as follows: glass (heat conduction layer film; 150 µm)/polycarbonate resin layer (heat insulation layer)/platinum phthalocyanine vapor deposition film (light absorption film; 0.2 µm)/polycarbonate resin layer (thermal lens forming layer; 20 µm)/platinum phthalocyanine vapor deposition film (light absorption film; 0.2 µm)/polycarbonate resin layer (heat insulation layer)/glass (heat conduction layer film; 150 µm). In a thermal lens forming element having this structure, the lower limit of thickness of the heat conduction layer film is preferably 10 µm, and more preferably 100 µm. While no upper limit is imposed on the heat conduction layer film thickness from the aspect of magnitude and/or speed of optical response, it is still necessary to design the thickness in accordance with the operational scheme, focal distance, and working distance of each of the condenser and receiver lenses being used.

EXAMPLES

The preferred embodiment of the present invention will next be explained in detail referring to specific examples.

Example 1

FIG. 1 shows the general configuration of an optical path switching device according to an Example 1 of the present invention. The optical path switching device of FIG. 1 is an example device formed by serially connecting three sets of optical path switching units each comprising "a control light source, dichroic mirror, condenser lens, thermal lens forming element, receiver lens, and mirror having a hole". In theory, the number of connected optical path switching units is not limited and may be any number, including one or any greater number. However, in practice, the possible number of connections is calculated based on transmittance of signal light in each optical path switching unit, initial intensity of the incident signal light introduced into the optical path switching device, and required final signal light intensity. For example, when transmittance of each unit is 80%, the resulting total transmittance of a device comprising three serially connected units is 51%.

Figure 3A:
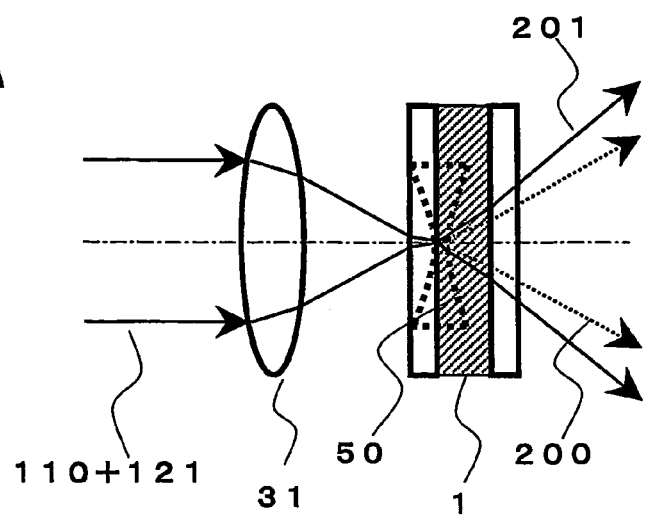
FIG. 3A is a diagram showing how a light proceeds when a thermal lens is formed.
Figure 3B:
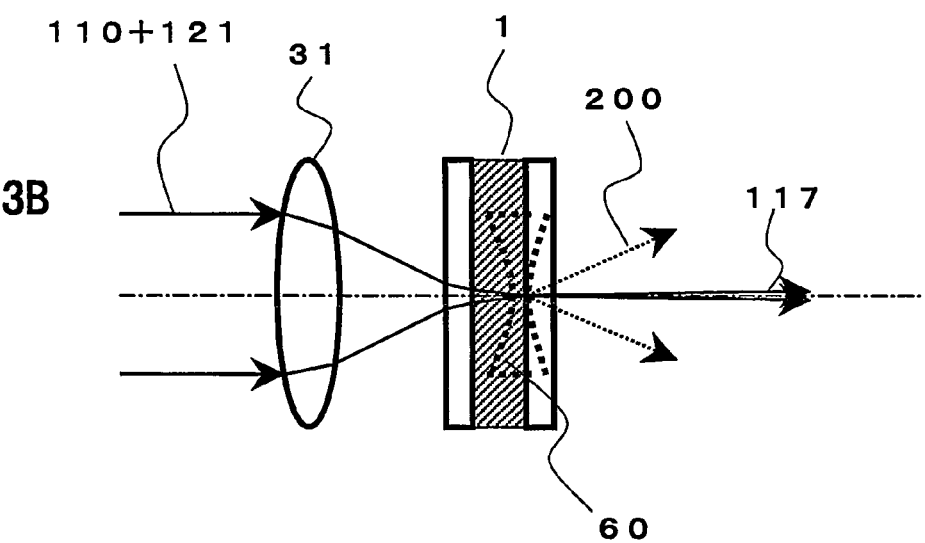
FIG. 3B is another diagram showing how a light proceeds when a thermal lens is formed.
Figure 4A:
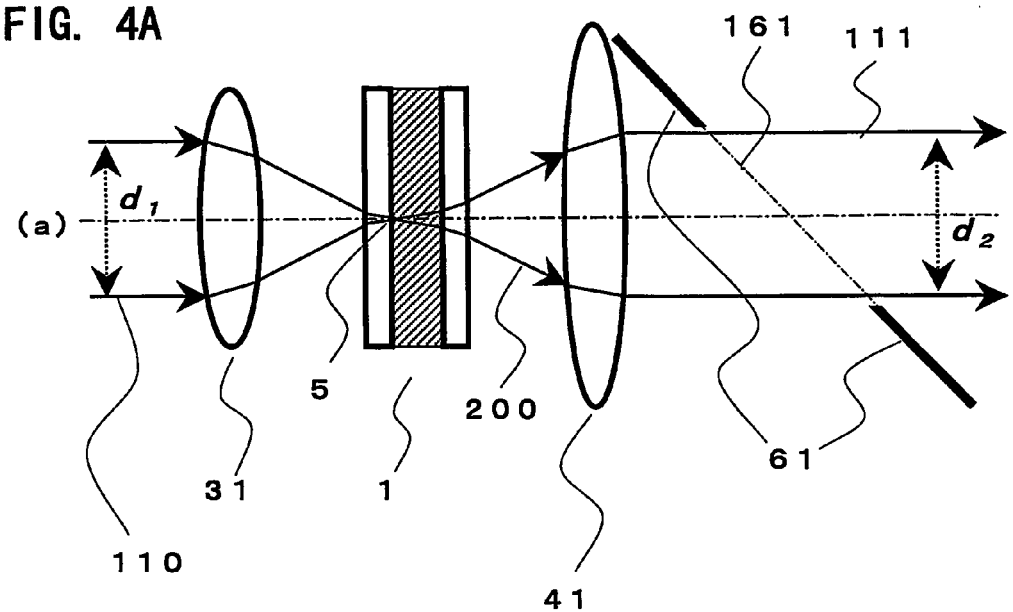
FIG. 4A is a diagram illustrating the principle of optical path switching for Example 1 of the present invention.
Figure 4B:
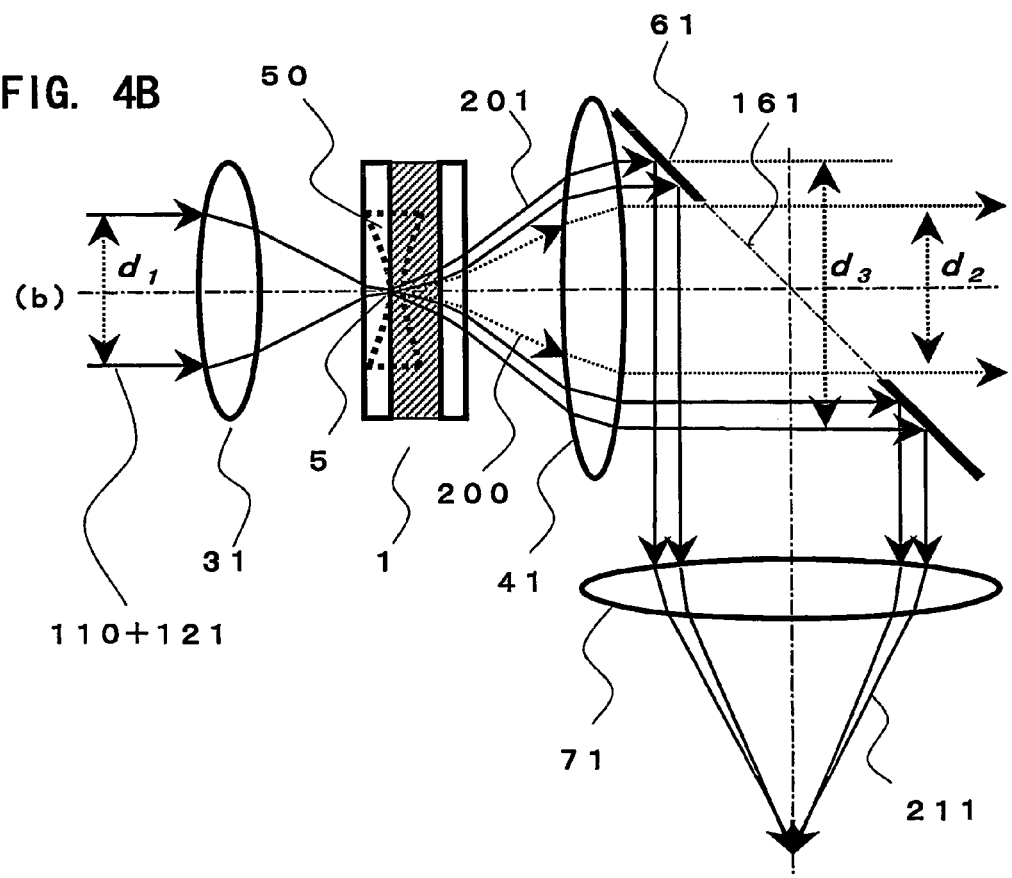
FIG. 4B is another diagram illustrating the principle of optical path switching for Example 1 of the present invention.

The optical path switching device of FIG. 1 comprising three serially connected units will next be explained in detail as one example. FIGS. 2A, 2B, 3A, and 3B are partial views showing the condenser lens 31 and the thermal lens forming element 1 of FIG. 1. FIGS. 4A and 4B are partial views further showing the receiver lens 41 and the mirror 61 having a hole, addition to the components shown in FIGS. 2A–3B. Although in all of the above-referenced FIGS. 1–4B the thermal lens forming element 1 is illustrated as having a three-layer structure comprising a "heat transmission layer film 91/light absorption layer film 92/heat transmission layer film 93" structure, the thermal lens forming element 1 not limited to such a structure.

An incident signal light 110 output from an optical fiber 100 is adjusted using a collimator lens 30 such that the signal light 110 becomes a substantially parallel beam having a beam radius of 5.0 mm. In the present example, a semiconductor laser having an oscillation wavelength of 780 nm was used as the signal light source. A semiconductor laser having an oscillation wavelength of 1350 nm or 1550 nm may alternatively be used. Further, in the present example, a semiconductor laser having an oscillation wavelength of 650 nm was used as each of the control light sources 21, 22, and 23 for generating the control lights 121, 122, and 123 used to form thermal lenses in the respective thermal lens forming elements 1, 2, and 3. An optical path of the signal light is switched by turning on and off the control lights. The control lights 121, 122, and 123 are employed after being shaped into a substantially parallel beam having a beam radius of 4.5 mm. Laser power of each of the control light sources provided before the respective condenser lenses 31, 32, and 33 is in a range between 2–10 mW.

The control lights 121, 122, and 123 and the signal lights 110, 111, and 112 are converged using common condenser lenses 31, 32, and 33, respectively, and irradiated on the thermal lens forming elements 1, 2, and 3, respectively. The signal and control lights are adjusted using the dichroic mirrors 51, 52, and 53 such that those signals become coaxial and parallel to one another, thereby allowing the beam waists of the signal and control lights to overlap within the thermal lens forming elements. With this arrangement, thermal effect generated by light absorption in the beam waist region of the control light can be efficiently exploited for changing the direction of the signal light.

When laser light is converged using a lens, the light intensity distribution at the beam waist (converged point or focus) takes the form of a Gaussian distribution. A laser light within a wavelength band that is absorbed by the light absorption film is used as the control light. This laser light is irradiated through the condenser lens onto the thermal lens forming element including a light absorption film, and converged within the light absorption film layer including the thermal lens forming layer. As a result, the light absorption film absorbs the laser light, thereby increasing the temperature and reducing the refraction index of the thermal lens forming layer. When a light having a Gaussian distribution as described above is irradiated, the area of the light absorption film layer which receives the irradiation of the converged center segment of the Gaussian distribution having the highest light intensity becomes the "center of light absorption". This center area attains the highest temperature as well as the lowest refraction index. The absorbed light in the region from the center area of light absorption toward the outward areas changes into heat. Due to this heat and the further outward spreading heat, the refraction index of the light absorption film layer including the thermal lens forming layer changes from the center of light absorption toward the outward areas in a spherical manner, generating a distribution of refraction index which is small in the center of light absorption and increasing toward the outward areas. This arrangement functions as a concave lens. Light passes at a higher speed in an area where refraction index is smaller. Accordingly, the speed of light passing through the area irradiated by the center segment of the Gaussian distribution having high light intensity is higher than the speed of light passing through the areas irradiated by peripheral segments of the Gaussian distribution having low light intensity. Consequently, light bends toward the directions of the areas irradiated by the peripheral segments of the Gaussian distribution having low light intensity. This effect is identical to that of a concave lens generated in atmosphere.

In the present example, the signal lights obtained after passing them through the thermal lens forming elements 1, 2, and 3 are collimated into substantially parallel beams using the receiver lenses 41, 42, and 43. The numerical aperture (NA) of these receiver lenses are selected to be greater than the NA of the condenser lenses. In the present example, the condenser lens NA was 0.25, while the receiver lens NA was 0.55. The receiver lens NA is preferably no less than double the condenser lens NA. As long as this relationship is satisfied, combinations of the condenser and receiver lens NAs other than that of the present example are possible. When the receiver lens NA is no less than double the condenser lens NA, the receiver lens can receive light without any loss even when the beam diameter of the signal light is expanded to double the initial beam diameter of the signal light first introduced into the thermal lens forming element. In the present embodiment, focal distances of the condenser and receiver lenses are identical, and effective diameter of the condenser lenses are approximately 10 mm.

The signal lights collimated by the receiver lenses 41, 42, and 43 are irradiated on the respective mirrors 61, 62, and 63 having a hole. As described later in detail, these mirrors with hole allow switching of the optical paths of the signal lights.

Figure 2A:
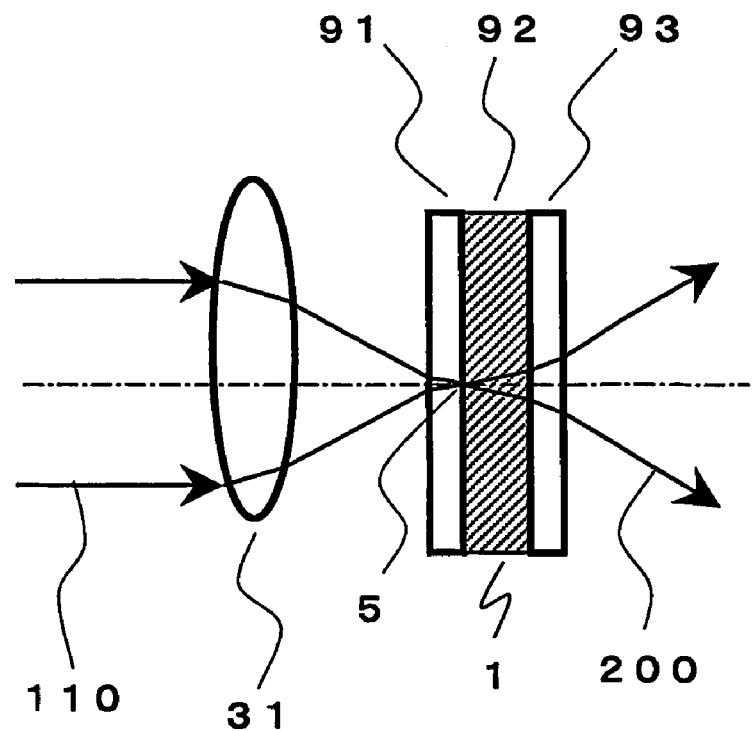
FIG. 2A is a diagram showing how a light proceeds when no thermal lens is formed.
Figure 2B:
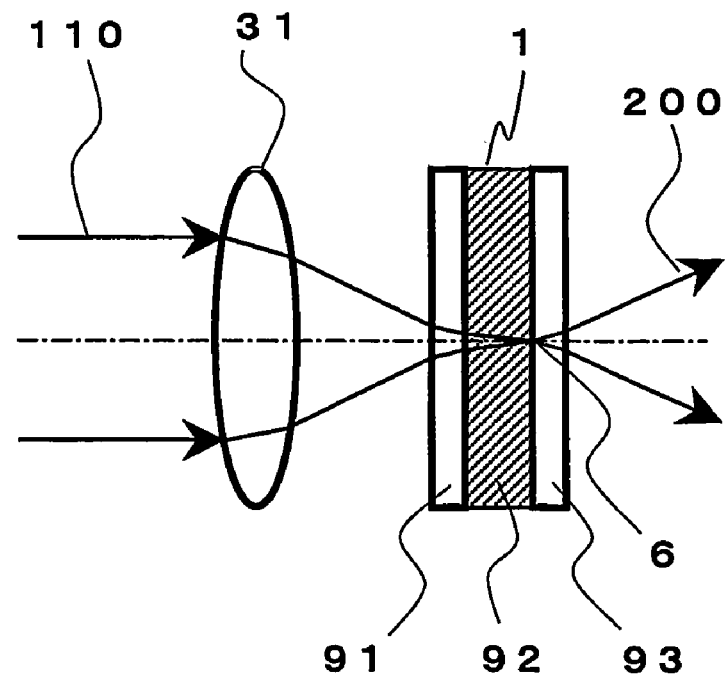
FIG. 2B is another diagram showing how a light proceeds when no thermal lens is formed.

On one hand, as shown in FIG. 2A, a control light having a wavelength within an absorption band of the light absorption layer film and a signal light having a wavelength within a transmission band may be simultaneously irradiated so as to be focused in a location 5 close to the incident surface of the light absorption layer film of the thermal lens forming element 1. In this case, as shown in FIG. 3A, a thermal lens 50 is formed by the control light in the location close to the incident surface. Because of this thermal lens 50, the cross-section of the signal light is spread in an annular manner, and the signal light is output as a dispersed output light 201 having a spread angle greater than that of a normal output light 200. On the other hand, as shown in FIG. 2B, the control and signal lights may be simultaneously irradiated so as to be focused in a location 6 close to the output surface of the light absorption layer film of the thermal lens forming element. In this case, as shown in FIG. 3B, a thermal lens 60 is formed by the control light in the location close to the output surface. Because of this thermal lens 60, the signal light is output as a converged output light 117. In both cases shown in FIGS. 2A and 2B, when the irradiation of the control light is ceased, the signal light receives no influence of the thermal lenses 50 or 60, and is output as an output light 200 having a normal spread angle.

Figure 7:
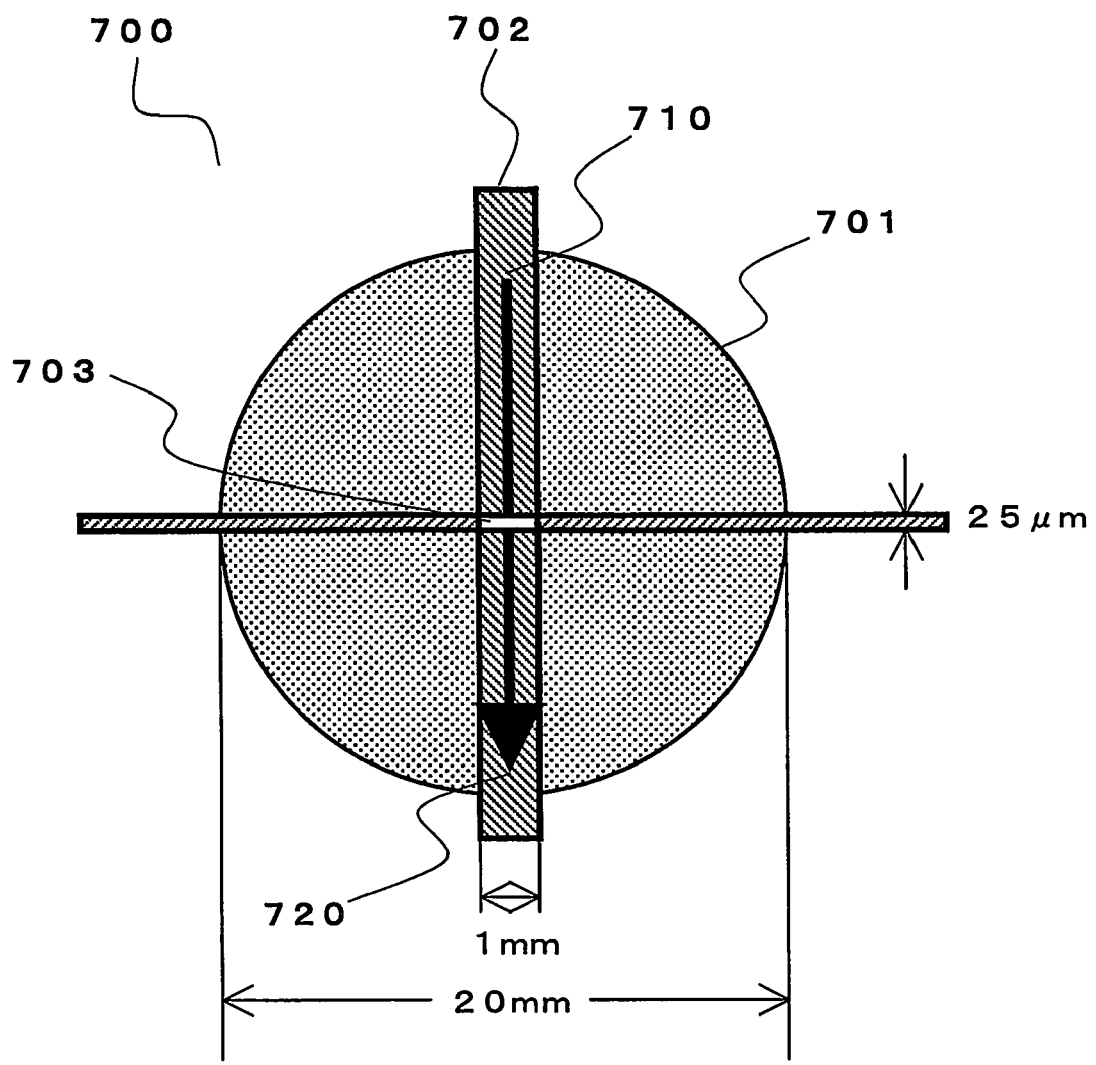
FIG. 7 is a diagram illustrating the relationship between a signal light beam and a slit used to measure a light intensity distribution in a cross-section of the signal light beam.
Figure 8:
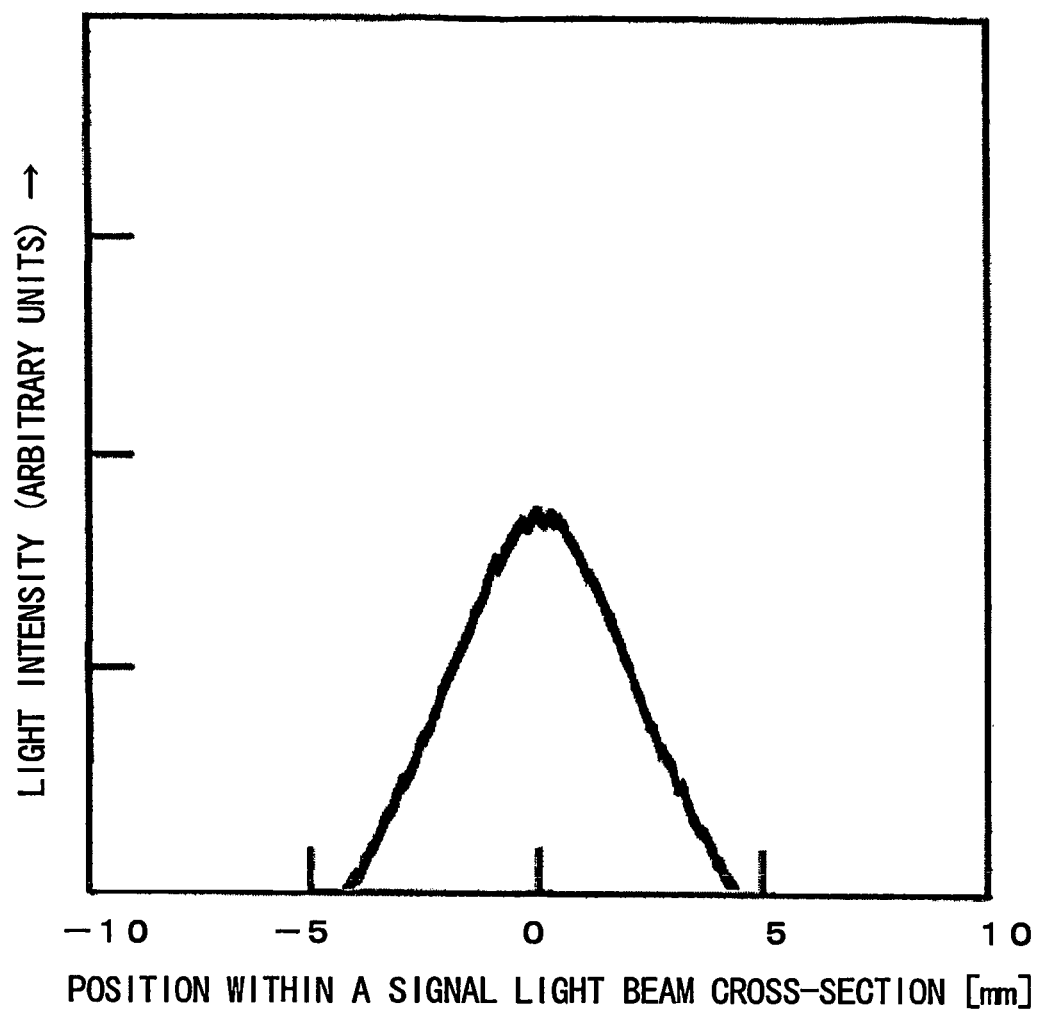
FIG. 8 is a diagram showing a light intensity distribution in a cross-section of a signal light beam.
Figure 9:
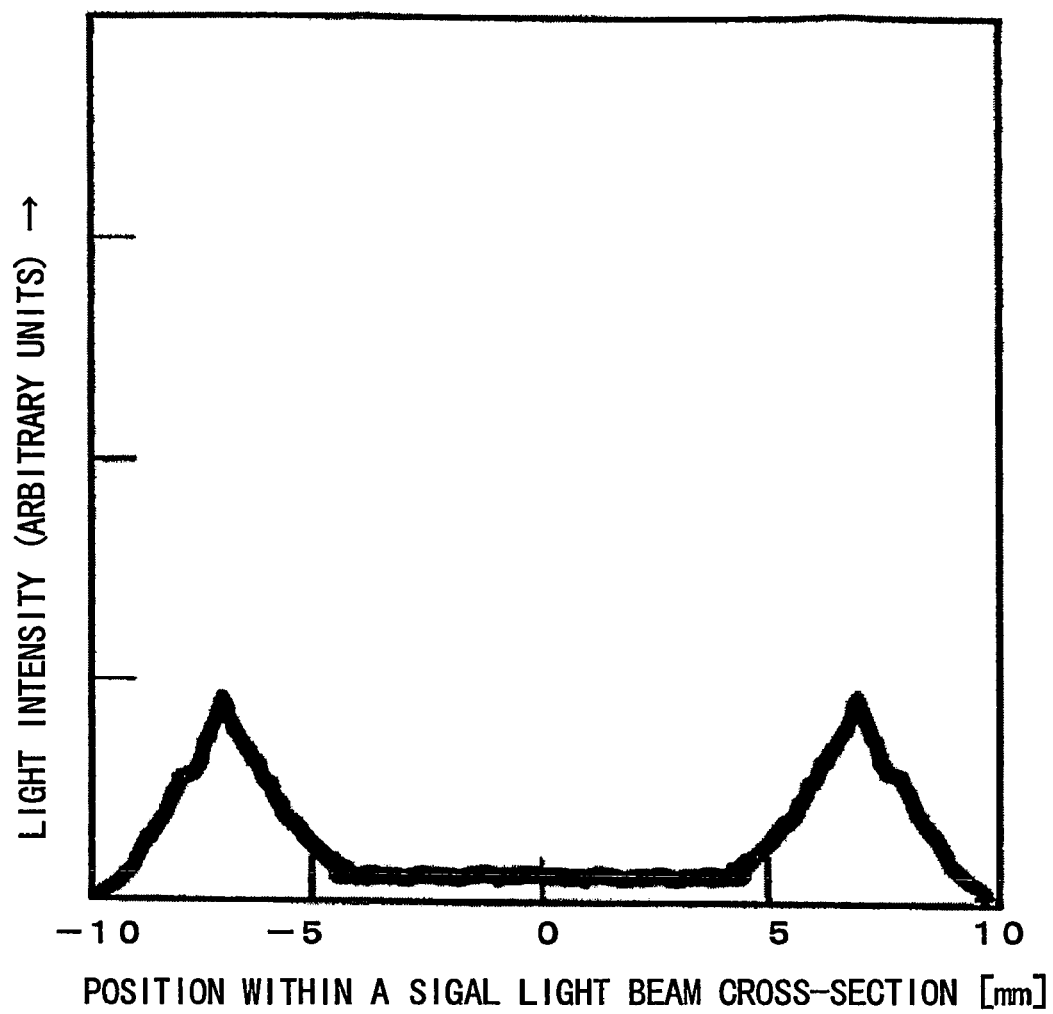
FIG. 9 is a diagram showing another light intensity distribution in a cross-section of a signal light beam.
Figure 10:
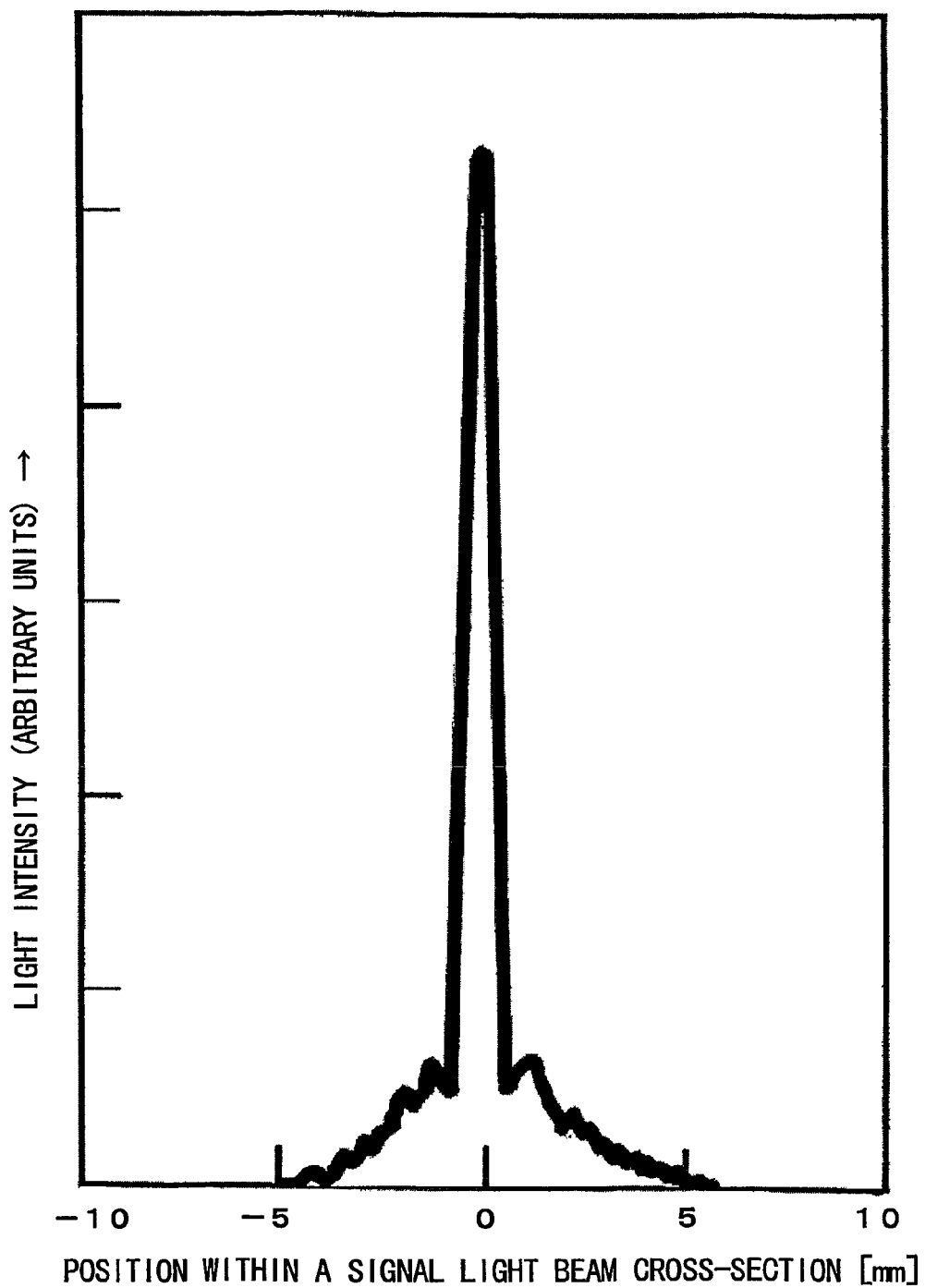
FIG. 10 is a diagram showing a further light intensity distribution in a cross-section of a signal light beam.

To examine the above-described thermal lens effect, measurements were made to determine differences in light intensity distribution in the signal light beam cross-section generated in accordance with the presence of the thermal lens effect and the difference in converging point location. More specifically, in a device as generally shown in FIG. 1 or FIGS. 4A and 4B having the receiver lens 41 NA of 0.55 and the condenser lens 31 NA of 0.25, a light intensity distribution measuring device 700 as generally shown in FIG. 7 was provided in place of the mirror 61. The entire signal light beam that passed through the thermal lens forming element 1 was received on the receiver lens 41 for collimating the beam. The parallel beam was then introduced into a light-receiving section 701 (having an effective diameter of 20 mm) of the light intensity distribution measuring device, so as to measure the light intensity distribution in the signal light beam cross-section. The measurement results are shown in FIGS. 8, 9, and 10. In the light intensity distribution measuring device 700, as shown in FIG. 7, a first slit 702 having a width of 1 mm is provided in the light-receiving section 701. In the lengthwise direction of the first slit, namely, in the direction from point 710 to point 720 in FIG. 7, a second slit 703 having a width of 25 µm is moved at a constant speed. The light intensity distribution measuring device 700 measures the intensity of light passing through the rectangular window of 1 mm×25 µm formed by the two slits as the window is moved, thereby providing measurements corresponding to the movement of the window. When measuring light intensity corresponding to the moved positions of the window, outputs from the detecting section which received the light passing through the window may be, for example, recorded using a storage oscilloscope in synchronization with the moving speed of the second slit 703. Each of FIGS. 8–10 shows a light intensity distribution in a beam cross-section of a signal light recorded by a storage oscilloscope in the above-described manner. In FIGS. 8–10, the coordinate system is defined such that, on the horizontal axis (indicating position within the beam cross-section), 0 denotes the center of the light-receiving section 701. Further, the position of point 710 in FIG. 7 is in the negative direction, while the position of point 720 is in the positive direction. The vertical axis indicates light intensity.

FIG. 8 illustrates a case corresponding to FIG. 4A, showing a light intensity distribution in a signal light beam cross-section obtained when no control light but the signal light alone is introduced into the thermal lens forming element 1. The light intensity distribution in this case is such that intensity is high in the central portion but gradually becomes lower toward the peripheral portions (roughly a "Gaussian distribution"). Accordingly, by positioning a mirror 61 provided with a hole 161 of a sufficiently large size as shown in FIG. 4A, the entire signal light beam 111 can pass through the hole 161 of the mirror 61. Assuming that $d_1$ denotes the beam diameter of the signal light entering the condenser lens 31 (having focal distance $f_1$) as a parallel beam, and $d_2$ denotes the beam diameter of the signal light 111 collimated into a parallel beam by the receiver lens 41 (having focal distance $f_2$), the following equation holds true:

$$f_1 : f_2 = d_1 : d_2 \tag{5}$$

Accordingly, $d_2$ can be calculated by equation [6].

$$d_2 = (f_2/f_1) \times d_1 \tag{6}$$

In the present Example 1, the mirror 61 is positioned at an angle of 45 degrees with respect to the optical axis of the signal light. Further, the cross-section of the signal light passing through the hole 161 is circular. Therefore, it is necessary that the shape of the hole 161 is an ellipse having a minor axis $D_1$ and a major axis $D_2$. The relationship between $D_1$ and $D_2$ can be expressed by the following equation:

$$D_2 = D_1 \times \sqrt{2} \tag{7}$$

Here, the minor axis $D_1$ of the hole 161 of the mirror 61 should be greater than the beam diameter $d_2$ of the signal light 111 obtained by equation [6]. However, if $D_1$ is excessively large, a portion of a signal light expanded in an annular manner by irradiation of the control light may undesirably pass through the hole. Accordingly, the optimal value of $D_1$ is $d_2$ multiplied by a value in the range between 1.02 and 1.20, and more preferably in the range between 1.01 and 1.10.

In the present Example 1, the focal distance $f_1$ of the condenser lens 31 and the focal distance $f_2$ of the receiver lens 41 were identical. Therefore, the beam diameter $d_1$ of the signal light 110 entering the condenser lens 31 and the beam diameter $d_2$ of the signal light 111 collimated into a parallel beam by the receiver lens 41 were identical, being 10 mm as noted above. Accordingly, the minor axis $D_1$ of the hole 161 of the mirror 61 is preferably in the range between 10.2 mm and 12.0 mm, and more preferably in the range between 10.1 mm and 11.0 mm. The actual value of minor axis $D_1$ of Example 1 was 10.5 mm. From equation, [7], $D_2$ was calculated to be 14.8 mm. Furthermore, the mirror used had a size (a squarish shape having a side length of 50 mm) sufficient for reflecting a beam having a diameter of 30 mm at an angle of 45 degrees.

FIG. 9 shows a light intensity distribution in a signal light beam cross-section obtained when the focus (converging point) is set at the location 5 (on the light incident side) close to the condenser lens 31 of the thermal lens forming element 1, and a control light is irradiated. The light intensity distribution in this case is such that intensity is low in the central portion and increased in the peripheral portions in an annular manner. Light intensity in the central portion of the signal light beam cross-section is reduced depending on the control light intensity and the positional relationship between the thermal lens forming element 1 and the focus. As the control light intensity is increased, the light intensity in the central portion of the signal light beam cross-section approaches zero. The portion having the highest signal light intensity is located beyond the initial beam diameter (at a portion around a diameter of approximately 15 mm).

Use of the thermal lens effect corresponding to FIG. 10 is described referring to an Example 2.

In summary, in the optical arrangement of FIG. 3A, according to whether or not the control light is irradiated, the light intensity distribution in the beam cross-section of the signal light after passing through the thermal lens forming element is switched between the annular distribution of FIG. 9 (when the control light is irradiated) and the Gaussian distribution of FIG. 8 (when the control light is not irradiated). These two types of light intensity distributions in the signal light beam cross-section can be discretely extracted using a mirror having a hole and a shape appropriate for the shapes of the distributions, thereby accomplishing switching of the signal light optical path.

In the present Example 1, the mirror 61 is positioned at an angle of 45 degrees with respect to the optical axis of the signal light. The mirror surface of the mirror 61 was formed by sputtering or depositing an aluminum film on a glass surface. The hole 161 of the mirror 61 was created by boring an elliptical hole in the glass at a tilt angle of 45 degrees. Instead of creating a hole, it is possible to simply omit attaching the aluminum reflection film in the elliptical shape. However, it is more preferable to create a hole because a glass surface reflects several % of an incident light, and this may cause attenuation and cross-talk of a signal light. The reflection film is not limited to a film made of aluminum, and may be a film composed of any material which reflects both the control and signal lights used, such as, for example, gold and silver.

The signal lights 211, 212, and 213 extracted by changing the initial signal beam direction by 90 degrees by executing the above-described optical path switching are converged by condenser lenses 71, 72, and 73 to be input in optical fibers 11, 12, and 13, respectively.

When all of the control light sources 21, 22, and 23 are turned off, the signal light receives no influence of thermal lens effect and is sequentially output as the signal lights 111, 112, and 113. The output signal light 113 is converged by a condenser lens 40 to be input in an optical fiber 101.

It should be noted that the signal light may be input in a detector or the like, instead of an optical fiber 11, 12, 13, or 101, so as to convert the carried information into an electric signal for extraction.

Unless the transmittance of the control light through the thermal lens forming elements 1, 2, and 3 is 0%, the control light is also transmitted and output from the thermal lens forming elements 1, 2, and 3 by an amount corresponding to the transmittance value. In order to prevent this control light from entering a subsequent thermal lens forming element to cause erroneous operation or cross-talk, it is necessary to minimize to as close to 0% as possible the transmittance of the control light through the thermal lens forming elements 1, 2, and 3. Furthermore, it is preferable to provide a wavelength selection filter (not shown) after each of the thermal lens forming elements 1, 2, and 3 or the receiver lenses 41, 42, and 43. A desired known wavelength selection filter can be employed as long as the filter completely blocks light within the wavelength band of the control light while efficiently transmitting light within the wavelength band of the signal light. For example, a plastic or glass colored with a dye or a glass having a dielectric multilayer deposition film on its surface may be used as the wavelength selection filter. Alternatively, it is also possible to form a thin film of a wavelength selection filter material on the surfaces of the receiver lenses 41, 42, and 43 by a process such as coating or sputtering, thereby allowing the thin film to serve the function of the wavelength selection filter.

The optical path switching device of the present Example 1 is formed by serially connecting three sets of optical path switching units each comprising "a control light source, dichroic mirror, condenser lens, thermal lens forming element, receiver lens, and mirror having a hole". According to this arrangement, when all of the control lights are turned off, the signal light proceeds straight and is input in the optical fiber 101. In contrast, when the control light 21 is turned on, the signal light 211 is input in the optical fiber 11. When the control light 21 is turned off and the control light 22 is turned on, the signal light 212 is input in the optical fiber 12. Moreover, when the control lights 21 and 22 are turned off and the control light 23 is turned on, the signal light 213 is input in the optical fiber 13. In this manner, optical paths of the signal light can be switched.

Figure 6:
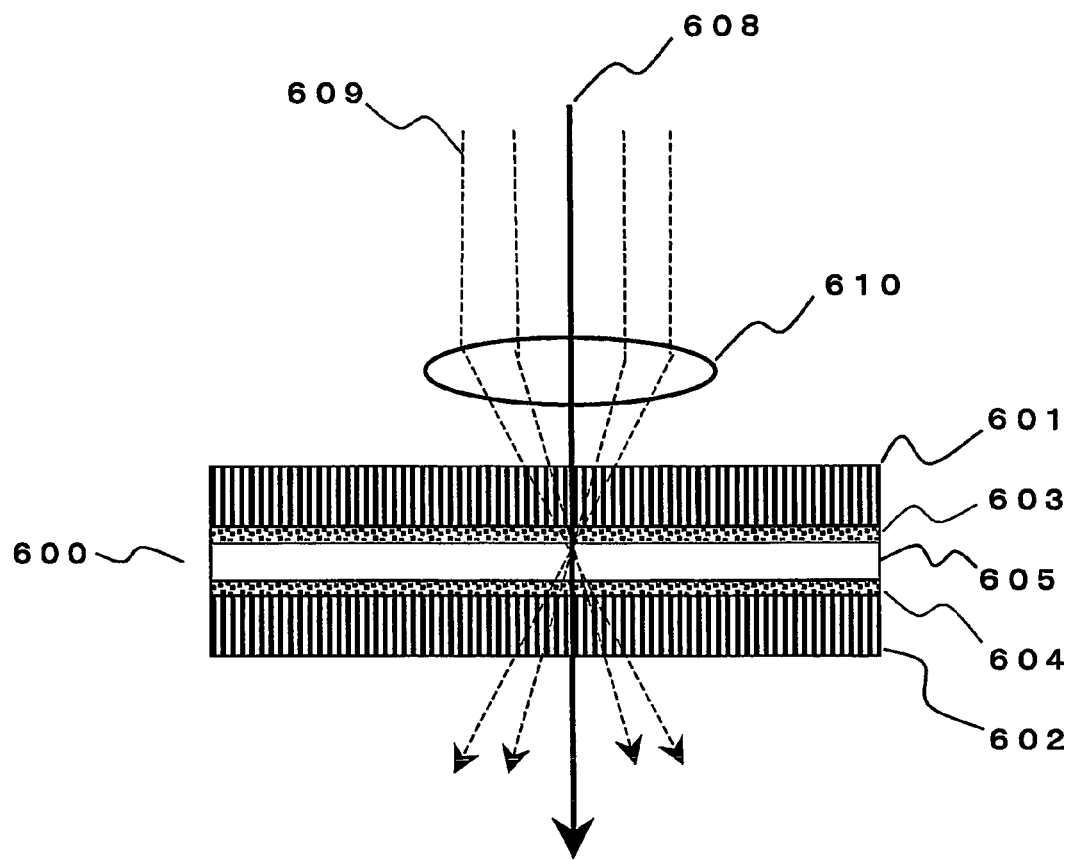
FIG. 6 is a cross-sectional view showing another example structure of a thermal lens forming element.

The thermal lens forming element 1 of Example 1 is illustrated in FIG. 6 as a thermal lens forming element 600 to show its general cross-sectional structure. A signal light 608 and a control light 609 are converged by a condenser lens 610 and irradiated on the thermal lens forming element 600. The rays of the control light 609 are schematically illustrated without showing refractions generated between the layer films.

The thermal lens forming element 600 having a "heat conduction layer film 601/light absorption film 603/thermal lens forming layer 605/light absorption film 604/heat conduction layer film 602" structure can be produced through the following process.

A vacuum container for cleaning substrates was connected via a gate valve to a vacuum vapor deposition device. Inside the vacuum container, two ultraviolet lamps each having a center wavelength of 185 nm and an output of 5 W and two ultraviolet lamps each having a center wavelength of 254 nm and an output of 5 W were installed in positions allowing ultraviolet light to be irradiated on a substrate surface. One or more glass plates (24 mm×30 mm×0.15 mm) were placed in the vacuum container as the substrate (serving as the heat conduction layer films 601 and 602). Subsequently, at the atmospheric pressure, the vacuum container was filled with clean nitrogen gas obtained by passing nitrogen gas through a gas filter rated to trap 100% of particles having a diameter of 0.05 µm or more. This process for purifying the atmosphere inside the vacuum container was continued until floating particles (of diameter 0.1 µm or larger) and contaminating gases were no longer detected. Next, oxygen gas obtained after passing oxygen gas through a gas filter rated to trap 100% a particles having a diameter of 0.051 µm or greater was introduced into the vacuum container until the oxygen concentration became 60% or higher. The ultraviolet lamps were then turned on to perform ultraviolet irradiation treatment and ozone treatment of the substrate surface for one hour. After completing the above-described cleaning process, the inside of the vacuum container for cleaning substrates was evacuated to attain a high-vacuum state of $10^{-4}$ Pa or lower. Subsequently, the substrate was transferred to the vacuum vapor deposition device similarly in a high-vacuum state of $10^{-4}$ Pa or lower. Platinum phthalocyanine (composition formula: $C_{32}H_{16}N_8Pt$), which was introduced in advance in the deposition source, was heated with a resistance wire to 600° C. so as to be vacuum-deposited on the substrate. During this process, the substrate temperature was not controlled. Progress of the deposition was monitored using a quartz resonator type film thickness meter. When the film thickness reached 0.2 µm, a shutter of the deposition source was closed to end the deposition process.

The surface of the deposition film formed on the substrate by the above procedures was photographed by scanning electron microscopy photography. From the photographs, it was observed that the platinum phthalocyanine that was vacuum-deposited under the above-described conditions existed in a state of particles having outer diameters in a range of between 30 and 50 nm. Such a particle diameter size is smaller than $\frac{1}{10}$ of the signal light wavelength (780 nm) and the control light wavelength (633 nm) employed in the present Example 1. Particles of this size would not cause light scattering.

In the meantime, a solution obtained by dissolving 1 g of polycarbonate resin (Panlite L1250 (registered trademark) manufactured by Teijin Chemicals Ltd.) into 19 g of dichloromethane was poured into 300 ml of n-hexane while mixing. The deposited resin clusters were filtered, then cleansed with 30 ml of n-hexane. Subsequently, the solvent was removed in a clean atmosphere. The clusters were grinded so as to obtain a fine powder having a particle diameter of less than 50 µm. The obtained polycarbonate resin fine powder was deaired by gradually heating to a temperature range between 100–120° C. for 48 hours inside a high-vacuum container of $10^{-4}$ Pa or lower.

Also in a clean atmosphere, the resin fine powder after high-vacuum de-airing was sprayed on the platinum phthalocyanine deposition film formed on a glass substrate according to the above procedures. Another platinum phthalocyanine deposition film formed on a glass substrate was placed thereon. This multilayer material was then placed on a heating stage inside a high-vacuum container. The inside of the container was evacuated to $10^4$ Pa or lower, and heated to 240–260° C. In addition, pressurizing plates heated to 240–260° C. were used to compress the multilayer material, thereby performing vacuum hot pressing under a pressure of 5 kgf/cm².

A multilayer thermal lens forming element having the structure comprising "glass (heat conduction layer film 601 having a thickness of 150 µm)/platinumphthalocyanine deposition film (light absorption film 603; 0.2 µm)/polycarbonate resin layer (thermal lens forming layer 605; 20 µm)/platinum phthalocyanine deposition film (light absorption film 604; 0.2 µm)/glass (heat conduction layer film 602; 150 µm)" was produced using the process described above. Transmittance of the thermal lens forming element was 81% for the signal light having a wavelength of 780 nm, and 0.09% (substantially 0%) for the control light having a wavelength of 633 nm.

The thickness of the thermal lens forming layer was controlled by adjusting the amount of the sprayed resin powder, the heating temperature, and the pressurizing time (between several minutes to several hours).

In order to measure the optical response speed of the optical path switching device of the present Example 1, a continuous light was used as the signal light, while an intermittent beam having a rectangular waveform with a frequency in the range between several Hz to 100 Hz and a duty ratio of 1:1 was employed as the control light. These signal and control lights were irradiated so as to make comparisons of the magnitudes of intensity amplitudes of the signal lights obtained via optical path switching.

Figure 13:
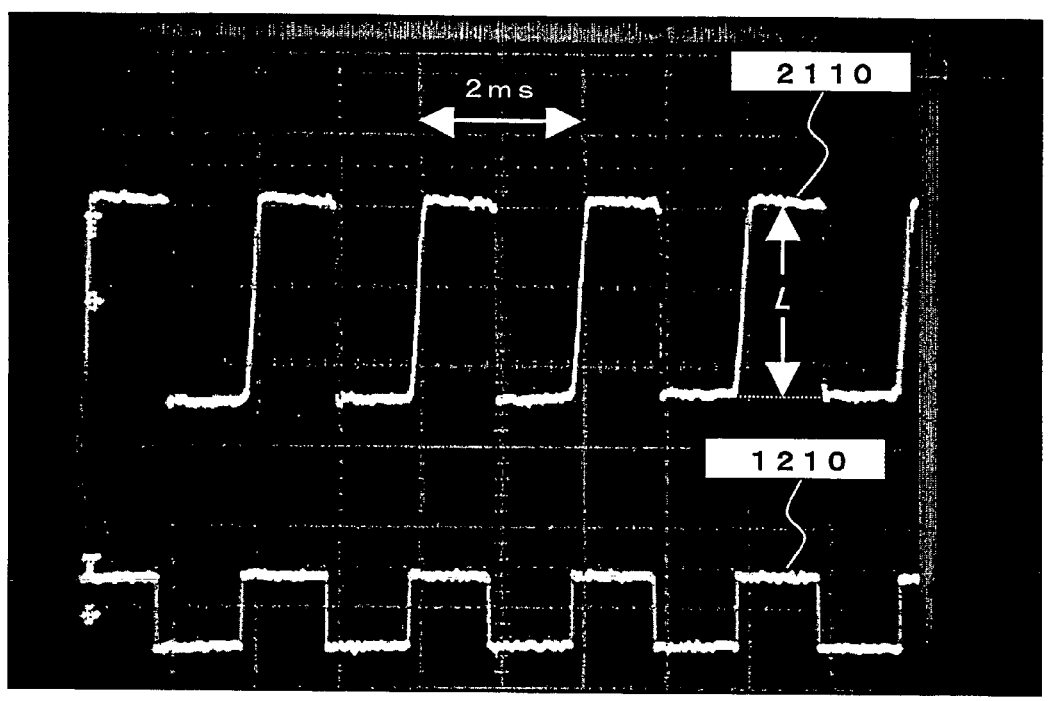
FIG. 13 is a diagram showing waveforms of a control light and a signal light detected using an oscilloscope.
Figure 14:
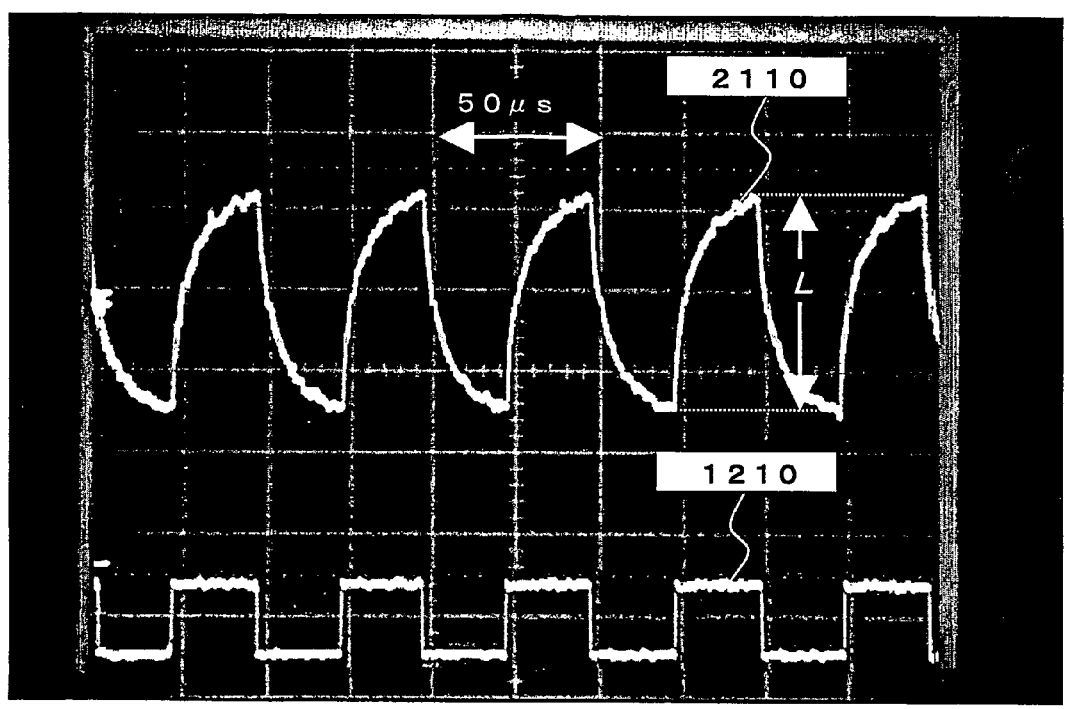
FIG. 14 is another diagram showing waveforms of a control light and a signal light detected using an oscilloscope.
Figure 15:
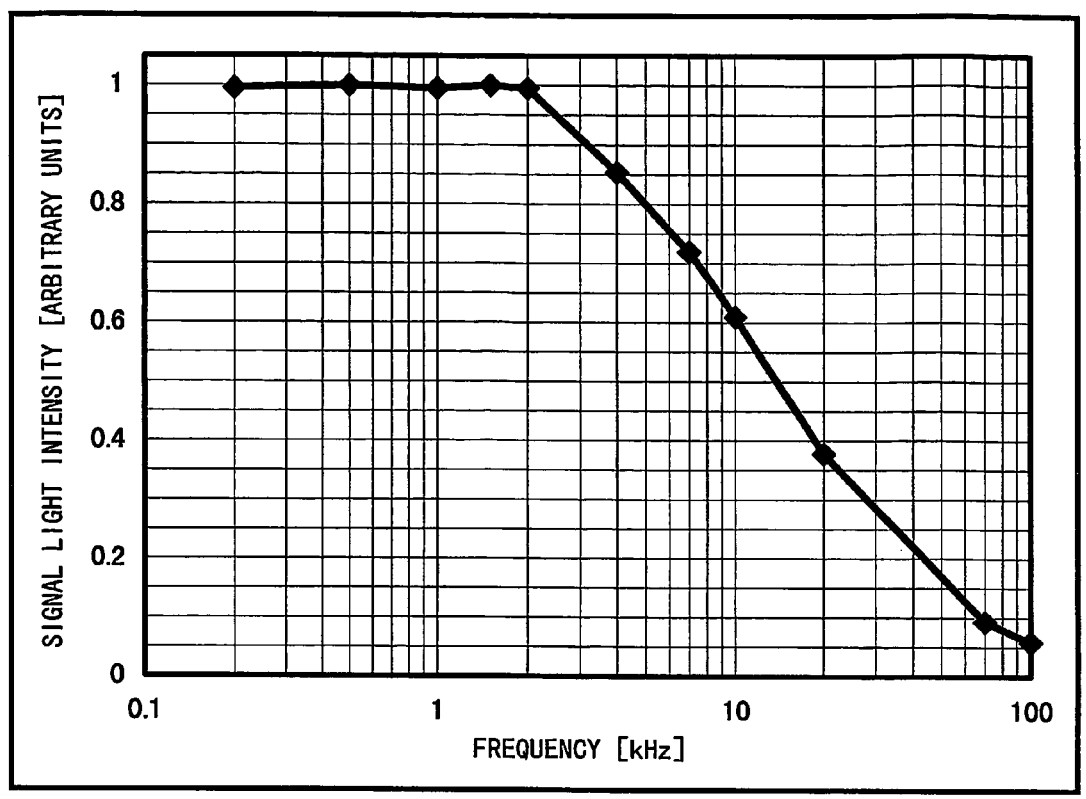
FIG. 15 is a diagram illustrating the relationship between the frequency of an intermittent control signal and the intensity (amplitude) of a signal light.

Each of FIGS. 13 and 14 shows a waveform 1210 of the control light 121 output from the control light source 21 in FIG. 1 measured using an oscilloscope by introducing the control light 121 into an optical detector, and a waveform 2110 of the switched signal light 211 measured using an oscilloscope by introducing into an optical detector the signal light 211 having its optical path switched in accordance with the ON/OFF of the control light 121. It is to be noted that the scale of the vertical axis of FIG. 14 is thrice that of the vertical axis of FIG. 13. Further, FIG. 15 shows the measurements of amplitude L of the signal light waveforms 2110 generated in accordance with the signal light intermittency resulting when the frequency of the rectangular waveform of the intermittent control light 121 was set within the range between 200 Hz and 100 kHz.

As shown in FIG. 13, the rectangular waveform of the intermittent control light 121 (FIG. 1) has a frequency of 500 Hz. Assuming that the amplitude L of the signal light wave form 2110 generated in accordance with the signal light intermittency resulting in this case is the reference amplitude value of 1, amplitude L of approximately 1 was obtained when the frequency of the rectangular waveform of the intermittent control light 121 was set within the range between 0.2–2 kHz. In other words, it was confirmed that optical path switching can be completed in 500 microseconds. This response speed is more than twice that of an optical switch using a thermooptical effect employing an electric heater, which has a response speed on the order of milliseconds.

As an example in which a control light having a higher frequency is used, FIG. 14 shows the signal light waveform 2110 obtained when the frequency was set at 20 kHz. As can be understood from FIG. 14, when the control light is turned off before complete optical path switching is executed by the thermal lens effect, the obtained signal light has a sawtooth waveform, and the amplitude L is reduced. In other words, when the frequency exceeds the response speed of the thermal lens effect, optical path switching becomes incomplete, such that a portion of the signal light remains proceeding straight without its path being switched.

In order to measure the durability of the optical path switching device of the present Example 1, a continuous light was used as the signal light, while an intermittent beam having a rectangular waveform with a frequency of 1 kHz and a duty ratio of 1:1 was employed as the control light. These signal and control lights were irradiated so as to compare, over time, the magnitudes of intensity amplitudes of the signal light obtained via optical path switching. No attenuation was observed in the intensity amplitudes of the signal light even after continuous 10,000 hours.

In order to test the polarization dependency of the optical path switching device of the present Example 1, experiments were performed by inserting one polarization element in each of the signal and control light beams to vary the polarization angle. However, absolutely no polarization dependency was detected.

Example 2

Figure 11A:
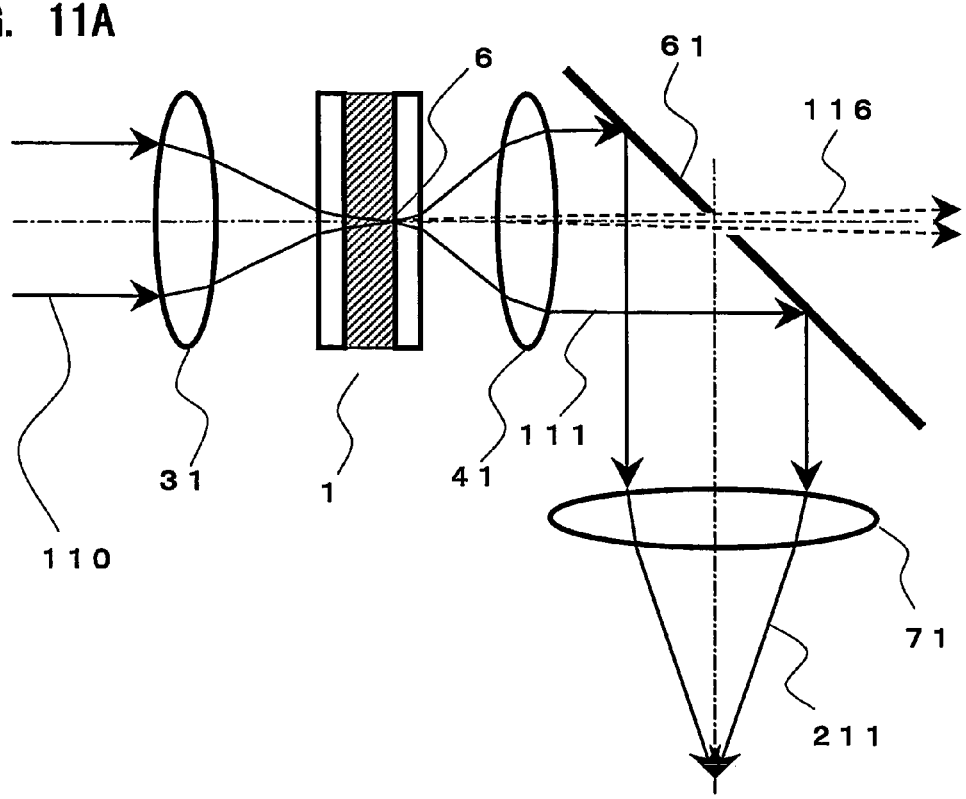
FIG. 11A is a diagram illustrating the principle of optical path switching for an Example 2 of the present invention.
Figure 11B:
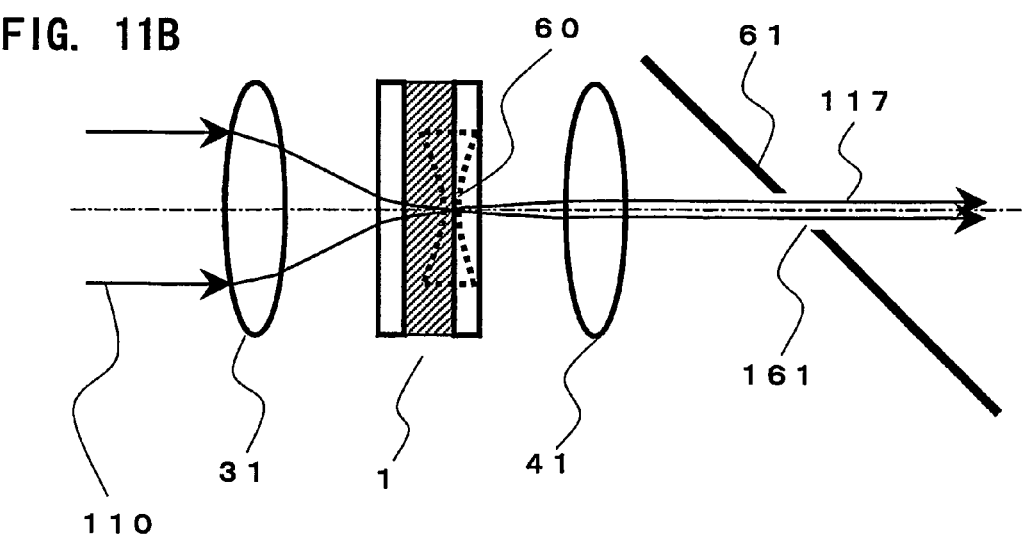
FIG. 11B is another diagram illustrating the principle of optical path switching for Example 2 of the present invention.

FIG. 10 shows an example light intensity distribution in a signal light beam cross-section obtained in an optical arrangement corresponding to FIGS. 3B and 11B, in which a control light is irradiated while the focus (converging point) is located, as in FIG. 2B, at a position 6 (on the light output side) close to the receiver lens 41 of the thermal lens forming element 1. In this example, light intensity in the center portion is greater than the center portion light intensity obtained when the control light is not irradiated (FIG. 8). While the center portion light intensity in the signal light beam cross-section in this example also depends on the control light intensity and the positional relationship between the thermal lens forming element 1 and the focus 6, the center portion intensity becomes several times greater with the control light than when the control light is not irradiated.

Accordingly, when a mirror 61 is provided in this example, most of the signal light beam passes through the hole 161 of the mirror 61. If the size of the hole 161 of the mirror 61 is optimized (to the diameter of 2 mm in the present Example 2), substantially no signal light is reflected by the mirror 61. On the other hand, even if the size of the hole 161 of the mirror 61 is optimized, it is impossible to prevent a central portion of the signal light from passing through the hole 161 as a signal light leak 116 when the control light is not irradiated (as in FIGS. 4A and 8). In other words, in the optical path switching device of Example 2, some signal light leak 116 (cross-talk) is inevitably caused as long as the intensity distribution in the signal light beam cross-section assumes a Gaussian distribution or similar form.

In other words, it is possible to reduce such signal light leak to substantially zero by changing the intensity distribution in a beam cross-section of the incident signal light into the thermal lens forming element. More specifically, when shaping a signal light 110 output from the optical fiber 100 using a collimator lens 30, the intensity distribution in the signal light beam cross-section can be readily adjusted so as to take the form of an annular distribution corresponding to FIG. 9 by selecting an appropriate lens shape (e.g., a conic lens) or configuration (e.g., a combination of convex and concave lenses). The signal light 110 having such an annular cross-sectional intensity distribution may be converged using a condenser lens 31 to the focal position 6 (FIG. 11A) to thereby be directed through the thermal lens forming element 1, and subsequently restored into a parallel beam using a receiver lens 41. The cross-sectional intensity distribution of the light beam thus obtained takes the form of an "annular" distribution having high intensity in the peripheral portions and substantially zero intensity in the center portion, as shown in FIG. 9. In this manner, it is possible to substantially eliminate signal light leak through the hole 161 when the mirror 61 is provided. When the intensity distribution in the signal light beam cross-section is "annular" as described above, by irradiating a control light to temporarily form a thermal lens 60 as shown in FIG. 11B, the signal light beam can be shaped into a sharp beam and output as a converged output signal light 117 proceeding straight through the hole 161 of the mirror 61.

To summarize, in an optical arrangement as shown in FIG. 11, the foci of the control and signal lights may be adjusted to a position 6 close to the output side of the thermal lens forming element, while the intensity distribution in the signal light beam cross-section is made annular. In this manner, the optical path of the output signal light can be changed by 90 degrees from the initial signal beam direction when the control light is not irradiated, and, when the control light is irradiated, the signal light can be allowed to proceed straight.

In order to measure the optical response speed of the optical path switching device of the present Example 2, a continuous light was used as the signal light, while an intermittent beam having a rectangular waveform with a frequency in the range between several Hz to 100 Hz and a duty ratio of 1:1 was employed as the control light. These signal and control lights were irradiated so as to enable comparisons of the magnitudes of intensity amplitudes of the signal lights obtained via optical path switching. From the measured results, assuming that the signal light intensity amplitude at 1 Hz is the reference amplitude value, no change in intensity amplitude was detected up to 2 kHz. When the frequency was further increased, the intensity amplitude gradually attenuated, reaching half the reference value at 10 kHz. In other words, it was confirmed that a complete optical path switching was possible within 500 microseconds. This response speed is twice as high compared to that of an optical switch using a thermooptical effect employing an electric heater.

In order to measure the durability of the optical path switching device of the present Example 2, a continuous light was used as the signal light, while an intermittent beam having a rectangular waveform with a frequency of 1 kHz and a duty ratio of 1:1 was employed as the control light. These signal and control lights were irradiated so as to compare, over time, the magnitudes of intensity amplitudes of the signal light obtained via optical path switching. In the results, no attenuation was observed in the intensity amplitudes of the signal light even after 10,000 continuous hours.

Example 3

The angle at which an optical path of the signal light 110 is switched with respect to its optical axis can be freely changed in the range between approximately 5–175 degrees by changing the positioning angle at which the mirror 61 is positioned in Example 1 (45 degrees with respect to the optical axis of the signal light 110), and determining a new shape (length of the major axis with respect to the minor axis) of the elliptical hole 161 through calculation using a trigonometric function based on the new positioning angle.

Furthermore, the switching direction of the signal light 110 path with respect to its optical axis can be freely changed through a 360 degree range by rotating the position of the mirror 61 while using the optical axis of the signal light 110 as the rotational axis, and accordingly adjusting the position of the condenser lens 71 and the like.

Example 4

An optical switching device of Example 4 was assembled in an identical manner as the device of Example 1, except that a thermal lens forming element produced according to the following procedures was used in place of the thermal lens forming element of Example 1 which includes a platinum phthalocyanine deposition film in the light absorption layer film. By performing the optical switching process using the device of Example 4, results equivalent or superior to those of the device of Example 1 could be accomplished.

First, tetraamino copper phthalocyanine was diazotized in concentrated hydrochloric acid. To the obtained material, a monomer mixture of methyl methacrylate, butyl methacrylate, and 2-hydroxyethyl methacrylate (at the molar ratio of 4:1:1) was added. The mixture was then gradually heated to synthesize a polymer-bonded dye containing copper phthalocyanine (the mass of copper phthalocyanine in the total mass was approximately 60%). The dye was dissolved in 2-butanone to eliminate acids and insoluble substances, and then refined by passing it through a column using 2-butanone as the solvent. The filler of the column was alumina (having an average particle diameter of approximately 50 µm) that was aerated to reduce its activity. Subsequently, the refined polymer-bonded dye was mixed with a polycarbonate resin in dichloromethane to obtain a mixture containing the polymer-bonded dye at 0.5% by weight with respect to the resin. The solvent was then eliminated, and the resulting material was grinded into fine powder. The powder was deaired by gradually heating from room temperature to 200° C. in a high-vacuum state of $10^{-4}$ Pa or lower.

A vacuum container for cleaning substrates was connected via a gate valve to a vacuum vapor deposition device. Inside the vacuum container, two ultraviolet lamps each having a center wavelength of 185 nm and an output of 5 W and two ultraviolet lamps each having a center wavelength of 254 nm and an output of 5 W were installed in positions allowing ultraviolet light to be irradiated on a substrate surface. One or more glass plates (24 mm×30 mm×0.15 mm) were placed in the vacuum container as the substrate (serving as the heat conduction layer films 601 and 602). Subsequently, at the atmospheric pressure, the vacuum container was filled with clean nitrogen gas obtained by passing nitrogen gas through a gas filter that traps 100% of particles having a diameter of 0.05 µm or greater. This process for purifying the atmosphere inside the vacuum container was continued until floating particles of diameter 0.1 µm or larger and contaminating gases were no longer detected. Next, oxygen gas obtained after passing oxygen gas through a gas filter rated to trap 100% of particles having a diameter of 0.05 µm or greater was introduced into the vacuum container until the oxygen concentration became 60% or higher. The ultraviolet lamps were then turned on to perform ultraviolet irradiation treatment and ozone treatment of the substrate surface for one hour. After completing the above-described cleaning process, the inside of the vacuum container for cleaning substrates was evacuated to attain a high-vacuum state of $10^{-4}$ Pa or lower. Subsequently, the substrate was transferred to a vacuum hot pressing device similarly in a high-vacuum state of $10^{-4}$ Pa or lower.

The powder mixture of the polymer-bonded dye containing copper phthalocyanine and the polycarbonate resin prepared as described above was placed between two glass plates having surfaces cleaned as described above. This multilayer material was subjected to hot pressing at 250° C. in a high-vacuum state of $10^{-4}$ Pa or lower, then cooled to room temperature.

By the above-described process, a thermal lens forming element having the structure comprising "glass (heat conduction layer film 601; 150 µm)/a layer (25 µm) simultaneously serving as the light absorption film and the thermal lens forming layer, composed of a mixture of a polymer-bonded dye containing copper phthalocyanine and a polycarbonate/glass (heat conduction layer film 602; 150 µm)" was produced.

In order to measure the optical response speed of the optical path switching device of the present Example 4, a continuous light was used as the signal light, while an intermittent beam having a rectangular waveform with a frequency in the range between several Hz to 100 Hz and a duty ratio of 1:1 was employed as the control light. These signal and control lights were irradiated so as to enable comparisons of the magnitudes of intensity amplitudes of the signal lights obtained via optical path switching. In the measured results, assuming that the signal light intensity amplitude at 1 Hz is the reference amplitude value, no change in intensity amplitude was detected up to 3 kHz. When the frequency was further increased, the intensity amplitude gradually attenuated, reaching half the reference value at 12 kHz. In other words, it was confirmed that optical path switching can be completed in 333 microseconds. This response speed is more than three times that of an optical switch using a thermooptical effect employing an electric heater.

In order to measure the durability of the optical path switching device of the present Example 4, a continuous light was used as the signal light, while an intermittent beam having a rectangular waveform with a frequency of 1 kHz and a duty ratio of 1:1 was employed as the control light. These signal and control lights were irradiated so as to compare, over time, the magnitudes of intensity amplitudes of the signal light obtained via optical path switching. From the results, no attenuation was observed in the intensity amplitudes of the signal light even after 20,000 continuous hours.

INDUSTRIAL APPLICABILITY

As described above in detail, the present invention provides an optical path switching device and method in which no electric circuits or mechanically moving parts are used. Such an optical path switching device and method are reliable, have excellent durability, and have no polarization dependency. Further, the optical path switching angles and directions can be freely set. Other advantages of the present invention are that attenuation of the signal light intensity is reduced, and that the device and method can be used in a multi-linked manner. Moreover, the optical path switching device and method accomplishes a sufficiently fast practical response speed.

Accordingly, the present invention provides an optical path switching device (optical switch) which does not employ an electric signal, in other words, an optical-to-optical direct switch, which is advantageously capable of dealing with the exponential increase in network traffic resulting from widespread use of the Internet and intranets in homes and offices.

What is claimed is:

1. An optical path switching device, comprising:
   a light absorption layer film arranged such that at least a control light focuses on the light absorption layer film;
   means for converging and irradiating on the light absorption layer film each of a control light having a wavelength selected from a wavelength band which is absorbed by the light absorption layer film and a signal light having a wavelength selected from a wavelength band which is not absorbed by the light absorption layer film;
   a thermal lens forming element including the light absorption layer film, wherein a thermal lens is reversibly formed according to a distribution of refraction index created by a temperature increase generated in and around an area of the light absorption layer film in which the control light is absorbed, such that, according to whether or not the control light is irradiated, the converged signal light is output either as is in its converged form or after its spread angle is changed; and
   a mirror including a hole and reflecting means, wherein, according to whether or not the control light is irradiated, the signal light output from the thermal lens forming element is either passed through the hole or reflected by the reflecting means to change the optical path.

2. An optical path switching device, comprising:
   a light absorption layer film arranged such that at least a control light focuses on the light absorption layer film;
   means for converging and irradiating on the light absorption layer film each of a control light having a wavelength selected from a wavelength band which is absorbed by the light absorption layer film and a signal light having a wavelength selected from a wavelength band which is not absorbed by the light absorption layer film;
   a thermal lens forming element including the light absorption layer film, wherein a thermal lens is reversibly formed according to a distribution of refraction index created by a temperature increase generated in and around an area of the light absorption layer film in which the control light is absorbed, such that, when the control light is not irradiated and the thermal lens is not formed, the converged signal light is output while spreading at a normal spread angle, and, when the control light is irradiated and the thermal lens is formed in the vicinity of an incident surface of the light absorption layer film, the converged signal light is output while spreading at a spread angle greater than the normal spread angle, thereby allowing the spread angle of the output signal light to be changed according to whether or not the control light is irradiated; and
   a mirror for changing the optical path, including a hole through which passes, when the control light is not irradiated and the thermal lens is not formed, the signal light output from the thermal lens forming element at the normal spread angle as is or after the spread angle is changed by a receiver lens, and means for reflecting, when the control light is irradiated and the thermal lens is formed in the vicinity of an incident surface of the light absorption layer film, the signal light output from the thermal lens forming element while spreading at the spread angle greater than the normal spread angle as is or after the spread angle is changed by the receiver lens.

3. An optical path switching device, comprising:
   a light absorption layer film arranged such that at least a control light focuses on the light absorption layer film;
   means for converging and irradiating on the light absorption layer film each of a control light having a wavelength selected from a wavelength band which is absorbed by the light absorption layer film and a signal light having a wavelength selected from a wavelength band which is not absorbed by the light absorption layer film;
   a thermal lens forming element including the light absorption layer film, wherein a thermal lens is reversibly formed according to a distribution of refraction index created by a temperature increase generated in and around an area of the light absorption layer film in which the control light is absorbed, such that, when the control light is irradiated and the thermal lens is formed in the vicinity of an output surface of the light absorption layer film, the converged signal light is output as converged, and, when the control light is not irradiated and the thermal lens is not formed, the converged signal light is output at a normal spread angle, thereby allowing the spread angle of the output signal light to be changed according to whether or not the control light is irradiated; and
   a mirror for changing the optical path, including a hole through which passes, when the control light is irradiated and the thermal lens is formed in the vicinity of an output surface of the light absorption layer film, the converged signal light output from the thermal lens forming element, and means for reflecting, when the control light is not irradiated and the thermal lens is not formed, the signal light output from the thermal lens forming element at the normal spread angle as is or after being passed through a receiver lens provided for changing the spread angle.

4. An optical path switching device as defined in claim 2, wherein the thermal lens forming element is composed of laminated films.

5. An optical path switching device as defined in claim 3, wherein the thermal lens forming element is composed of laminated films.

6. An optical path switching device as defined in claim 2, wherein a thickness of the light absorption layer film does not exceed double a confocal distance of the converged control light.

7. An optical path switching device as defined in claim 3, wherein a thickness of the light absorption layer film does not exceed double a confocal distance of the converged control light.

8. An optical path switching device as defined in claim 2, wherein one or both of a concentration of a light-absorbing component in the light absorption layer film or a thickness of a light absorption film included in the light absorption layer film are controlled such that a transmittance of the control light propagating through the light absorption layer film within the thermal lens forming element is in a range between 90% and 0%, and a transmittance of the signal light propagating through the light absorption layer film within the thermal lens forming element is in a range between 10% and approximately 100% when the control light is not irradiated.

9. An optical path switching device as defined in claim 3, wherein one or both of a concentration of a light-absorbing component in the light absorption layer film or a thickness of a light absorption film included in the light absorption layer film are controlled such that a transmittance of the control light propagating through the light absorption layer film within the thermal lens forming element is in a range between 90% and 0%, and a transmittance of the signal light propagating through the light absorption layer film within the thermal lens forming element is in a range between 10% and approximately 100% when the control light is not irradiated.

10. An optical path switching device as defined in claim 2, wherein
the light absorption layer film includes a thermal lens forming layer;
the thermal lens forming layer is composed of a liquid crystal; and
the liquid crystal comprises at least one type of liquid crystal selected from a group consisting of various cholesterol derivatives, 4'-n-alkoxybenzylidene-4-cyanoanilines, 4'-alkoxybenzylideneanilines, 4'-cyanobenzylidene-4-alkoxyanilines, carbonic esters, 4'-alkoxyphenyl 4-alkylbenzoates, azoxybenzene derivatives, 4-cyano-4'-alkylbiphenyls, and ferroelectric liquid crystals including 4',4"-octyloxybiphenyl (2S,3S)-3-methyl-2-chloropentanoate, 4-hexyloxyphenyl 4'-(2-methylbutyl)biphenyl-4-carboxylate, and 4-(2-methylbutyl)phenyl 4'-octylbiphenyl-4-carboxylate.

11. An optical path switching device as defined in claim 3, wherein
the light absorption layer film includes a thermal lens forming layer;
the thermal lens forming layer is composed of a liquid crystal; and
the liquid crystal comprises at least one type of liquid crystal selected from a group consisting of various cholesterol derivatives, 4'-n-alkoxybenzylidene-4-cyanoanilines, 4'-alkoxybenzylideneanilines, 4'-cyanobenzylidene-4-alkoxyanilines, carbonic esters, 4'-alkoxyphenyl 4-alkylbenzoates, azoxybenzene derivatives, 4-cyano-4'-alkylbiphenyls, and ferroelectric liquid crystals including 4',4"-octyloxybiphenyl (2S,3S)-3-methyl-2-chloropentanoate, 4-hexyloxyphenyl 4'-(2-methylbutyl)biphenyl-4-carboxylate, and 4-(2-methylbutyl)phenyl 4'-octylbiphenyl-4-carboxylate.

12. An optical path switching device as defined in claim 2, wherein the means for irradiating controls beam cross-sectional shape and size of each of the signal and control lights such that a beam cross-section of the signal light in the vicinity of its beam waist having the highest photon density does not exceed a beam cross-section of the control light at its beam waist.

13. An optical path switching device as defined in claim 3, wherein the means for irradiating controls beam cross-sectional shape and size of each of the signal and control lights such that a beam cross-section of the signal light in the vicinity of its beam waist having the highest photon density does not exceed a beam cross-section of the control light at its beam waist.

14. An optical path switching device as defined in claim 2, wherein
the means for converging and irradiating each of the control and signal lights is a condenser lens; and
a numerical aperture of the receiver lens is no less than double a numerical aperture of the condenser lens.

15. An optical path switching device as defined in claim 3, wherein
the means for converging and irradiating each of the control and signal lights is a condenser lens; and
a numerical aperture of the receiver lens is no less than double a numerical aperture of the condenser lens.

16. An optical path switching method, comprising:
converging and irradiating, on a light absorption layer film provided in a thermal lens forming element including at least the light absorption layer film, each of a control light having a wavelength selected from a wavelength band which is absorbed by the light absorption layer film and a signal light having a wavelength selected from a wavelength band which is not absorbed by the light absorption layer film, while adjusting an arrangement of the light absorption layer film such that at least the control light focuses within the light absorption layer film, thereby allowing a thermal lens to be reversibly formed according to a distribution of refraction index created by a temperature increase generated in and around an area of the light absorption layer film in which the control light is absorbed, such that, according to whether or not the control light is irradiated, the converged signal light is output either as is in its converged form or after its spread angle is changed; and
using a mirror including a hole and reflecting means so as to, according to whether or not the control light is irradiated, allow the signal light output from the thermal lens forming element to be either passed through the hole or reflected by the reflecting means to change the optical path.

17. An optical path switching method, comprising:
converging and irradiating, on a light absorption layer film provided in a thermal lens forming element including at least the light absorption layer film, each of a control light having a wavelength selected from a wavelength band which is absorbed by the light absorption layer film and a signal light having a wavelength selected from a wavelength band which is not absorbed by the light absorption layer film, while adjusting an arrangement of the light absorption layer film such that at least the control light focuses within the light absorption layer film, thereby allowing a thermal lens to be reversibly formed according to a distribution of refraction index created by a temperature increase generated in and around an area of the light absorption layer film in which the control light is absorbed, such that, when the control light is not irradiated and the thermal lens is not formed, the converged signal light is output from the thermal lens forming element while spreading at a normal spread angle, and, when the control light is irradiated and the thermal lens is formed in the vicinity of an incident surface of the light absorption layer film, the converged signal light is output from the thermal lens forming element while spreading at a spread angle greater than the normal spread angle, thereby changing the spread angle of the output signal light according to whether or not the control light is irradiated;

when the control light is not irradiated and the thermal lens is not formed, allowing the signal light output from the thermal lens forming element at the normal spread angle to pass, as is or after the spread angle is changed by a receiver lens, through a hole in a mirror and proceed along a straight path; and when the control light is irradiated and the thermal lens is formed in the vicinity of an incident surface of the light absorption layer film, allowing the signal light output from the thermal lens forming element while spreading at the spread angle greater than the normal spread angle to be, as is or after the spread angle is changed by the receiver lens, reflected using a reflection surface of the mirror to change optical path.

18. An optical path switching method, comprising:

converging and irradiating, on a light absorption layer film provided in a thermal lens forming element including at least the light absorption layer film, each of a control light having a wavelength selected from a wavelength band which is absorbed by the light absorption layer film and a signal light having a wavelength selected from a wavelength band which is not absorbed by the light absorption layer film, while adjusting an arrangement of the light absorption layer film such that at least the control light focuses within the light absorption layer film, thereby allowing a thermal lens to be reversibly formed according to a distribution of refraction index created by a temperature increase generated in and around an area of the light absorption layer film in which the control light is absorbed, such that, when the control light is irradiated and the thermal lens is formed in the vicinity of an output surface of the light absorption layer film, the converged signal light is output from the thermal lens forming element as converged, and, when the control light is not irradiated and the thermal lens is not formed, the converged signal light is output from the thermal lens forming element at a normal spread angle, thereby changing the spread angle of the output signal light according to whether or not the control light is irradiated;

when the control light is irradiated and the thermal lens is formed in the vicinity of the output surface of the light absorption layer film, allowing the converged signal light output from the thermal lens forming element pass through a hole in a mirror and proceed along a straight path; and when the control light is not irradiated and the thermal lens is not formed, allowing the signal light output from the thermal lens forming element at the normal spread angle to be, as is or after the spread angle is changed by a receiver lens, reflected using a reflection surface of the mirror to change optical path.

19. An optical path switching method as defined in claim 17, wherein the thermal lens forming element is composed of laminated films.

20. An optical path switching method as defined in claim 18, wherein the thermal lens forming element is composed of laminated films.

21. An optical path switching method as defined in claim 17, wherein a thickness of the light absorption layer film does not exceed double a confocal distance of the converged control light.

22. An optical path switching method as defined in claim 18, wherein a thickness of the light absorption layer film does not exceed double a confocal distance of the converged control light.

23. An optical path switching method as defined in claim 17, wherein one or both of a concentration of a light-absorbing component in the light absorption layer film or a thickness of a light absorption film included in the light absorption layer film are controlled such that a transmittance of the control light propagating through the light absorption layer film within the thermal lens forming element is in a range between 90% and 0%, and a transmittance of the signal light propagating through the light absorption layer film within the thermal lens forming element is in a range between 10% and approximately 100% when the control light is not irradiated.

24. An optical path switching method as defined in claim 18, wherein one or both of a concentration of a light-absorbing component in the light absorption layer film or a thickness of a light absorption film included in the light absorption layer film are controlled such that a transmittance of the control light propagating through the light absorption layer film within the thermal lens forming element is in a range between 90% and 0%, and a transmittance of the signal light propagating through the light absorption layer film within the thermal lens forming element is in a range between 10% and approximately 100% when the control light is not irradiated.

25. An optical path switching method as defined in claim 17, wherein the light absorption layer film includes a thermal lens forming layer;

the thermal lens forming layer is composed of a liquid crystal; and the liquid crystal comprises at least one type of liquid crystal selected from a group consisting of various cholesterol derivatives, 4'-n-alkoxybenzylidene-4-cyanoanilines, 4'-alkoxybenzylideneanilines, 4'-cyanobenzylidene-4-alkoxyanilines, carbonic esters, 4'-alkoxyphenyl 4-alkylbenzoates, azoxybenzene derivatives, 4-cyano-4'-alkylbiphenyls, and ferroelectric liquid crystals including 4',4"-octyloxybiphenyl (2S,3S)-3-methyl-2-chloropentanoate, 4-hexyloxyphenyl 4'-(2-methylbutyl)biphenyl-4-carboxylate, and 4-(2-methylbutyl)phenyl 4'-octylbiphenyl-4-carboxylate.

26. An optical path switching method as defined in claim 18, wherein the light absorption layer film includes a thermal lens forming layer;

the thermal lens forming layer is composed of a liquid crystal; and the liquid crystal comprises at least one type of liquid crystal selected from a group consisting of various cholesterol derivatives, 4'-n-alkoxybenzylidene-4-cyanoanilines, 4'-alkoxybenzylideneanilines, 4'-cyanobenzylidene-4-alkoxyanilines, carbonic esters, 4'-alkoxyphenyl 4-alkylbenzoates, azoxybenzene derivatives, 4-cyano-4'-alkylbiphenyls, and ferroelectric liquid crystals including 4',4"-octyloxybiphenyl (2S,3S)-3-methyl-2-chloropentanoate, 4-hexyloxyphenyl 4'-(2-methylbutyl)biphenyl-4-carboxylate, and 4-(2-methylbutyl)phenyl 4'-octylbiphenyl-4-carboxylate.

27. An optical path switching method as defined in claim 17, wherein when the signal and control lights irradiate, controlling beam cross-sectional shape and size of each of the signal and control lights such that abeam cross-section of the signal light in the vicinity of its beam waist having the highest photon density does not exceed a beam cross-section of the control light at its beam waist.

28. An optical path switching method as defined in claim 18, wherein when the signal and control lights irradiate, controlling beam cross-sectional shape and size of each of the signal and control lights such that abeam cross-section of the signal light in the vicinity of its beam waist having the highest photon density does not exceed a beam cross-section of the control light at its beam waist.

29. An optical path switching method as defined in claim 17, wherein
　　the means for converging and irradiating each of the control and signal lights is a condenser lens; and
　　a numerical aperture of the receiver lens is no less than double a numerical aperture of the condenser lens.

30. An optical path switching method as defined in claim 18, wherein
　　the means for converging and irradiating each of the control and signal lights is a condenser lens; and
　　a numerical aperture of the receiver lens is no less than double a numerical aperture of the condenser lens.

* * * * *

UNITED STATES PATENT AND TRADEMARK OFFICE
CERTIFICATE OF CORRECTION

PATENT NO. : 7,215,491 B2  
APPLICATION NO. : 10/525031  
DATED : May 8, 2007  
INVENTOR(S) : Ichiro Ueno et al.

It is certified that error appears in the above-identified patent and that said Letters Patent is hereby corrected as shown below:

Title page

Please delete the following: Item

(73) Assignees: National Institute of Advanced Industrial Science and Technology, Tokyo (JP); Dainichiseika Color & Chemical Mfg. Co., Ltd., Tokyo (JP)

And replace with: Item

(73) Assignees: National Institute of Advanced Industrial Science and Technology, Tokyo (JP); Dainichiseika Color & Chemicals Mfg. Co., Ltd., Tokyo (JP)

Signed and Sealed this

Third Day of July, 2007

JON W. DUDAS  
*Director of the United States Patent and Trademark Office*